April 24, 1945.  C. A. BICKEL  2,374,322
LATHE
Filed Nov. 27, 1940  13 Sheets-Sheet 1
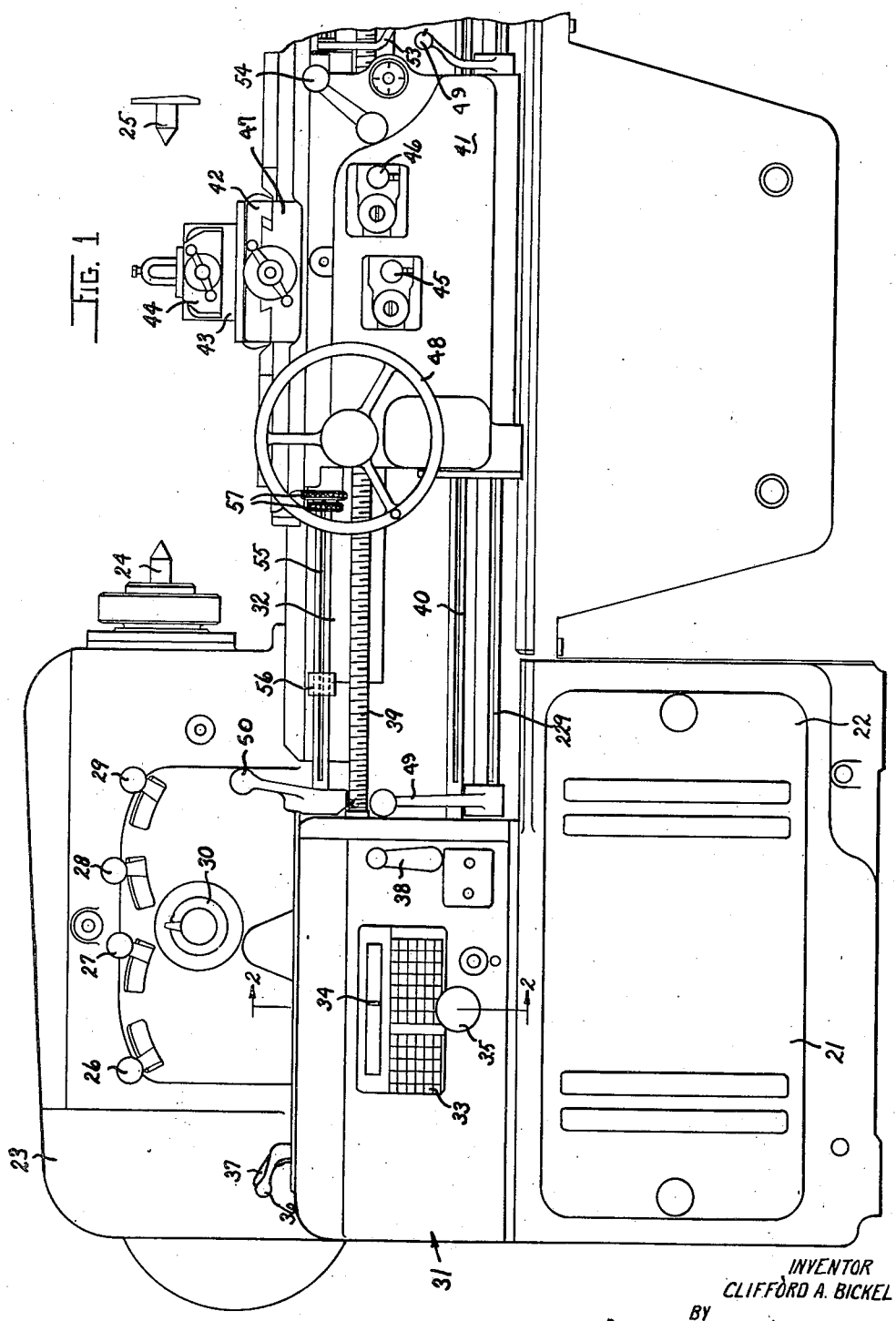
INVENTOR
CLIFFORD A. BICKEL
BY
Toulmin & Toulmin
ATTORNEYS April 24, 1945.  C. A. BICKEL  2,374,322
LATHE
Filed Nov. 27, 1940    13 Sheets-Sheet 2

INVENTOR
CLIFFORD A. BICKEL
BY
Toulmin & Toulmin
ATTORNEYS

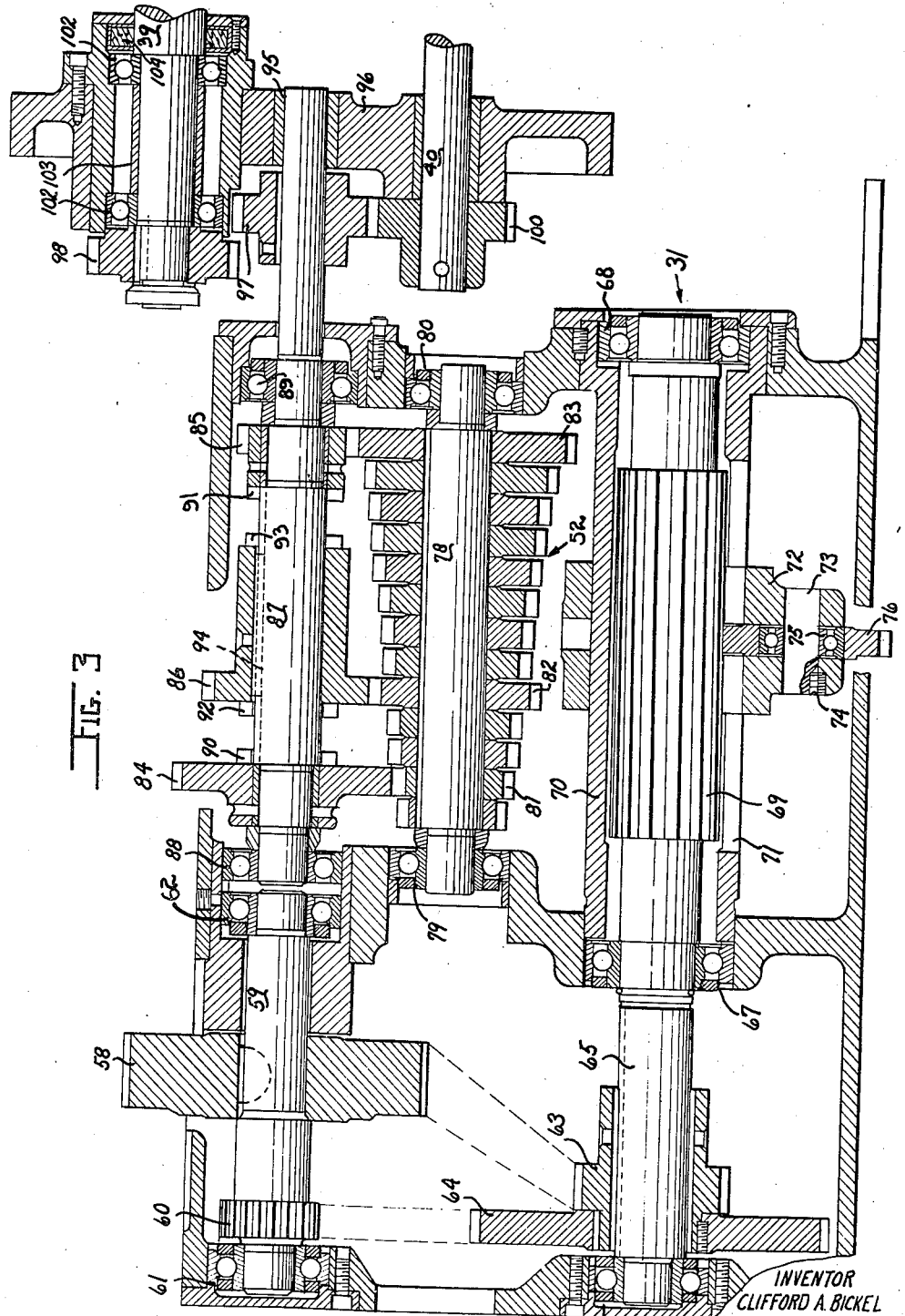

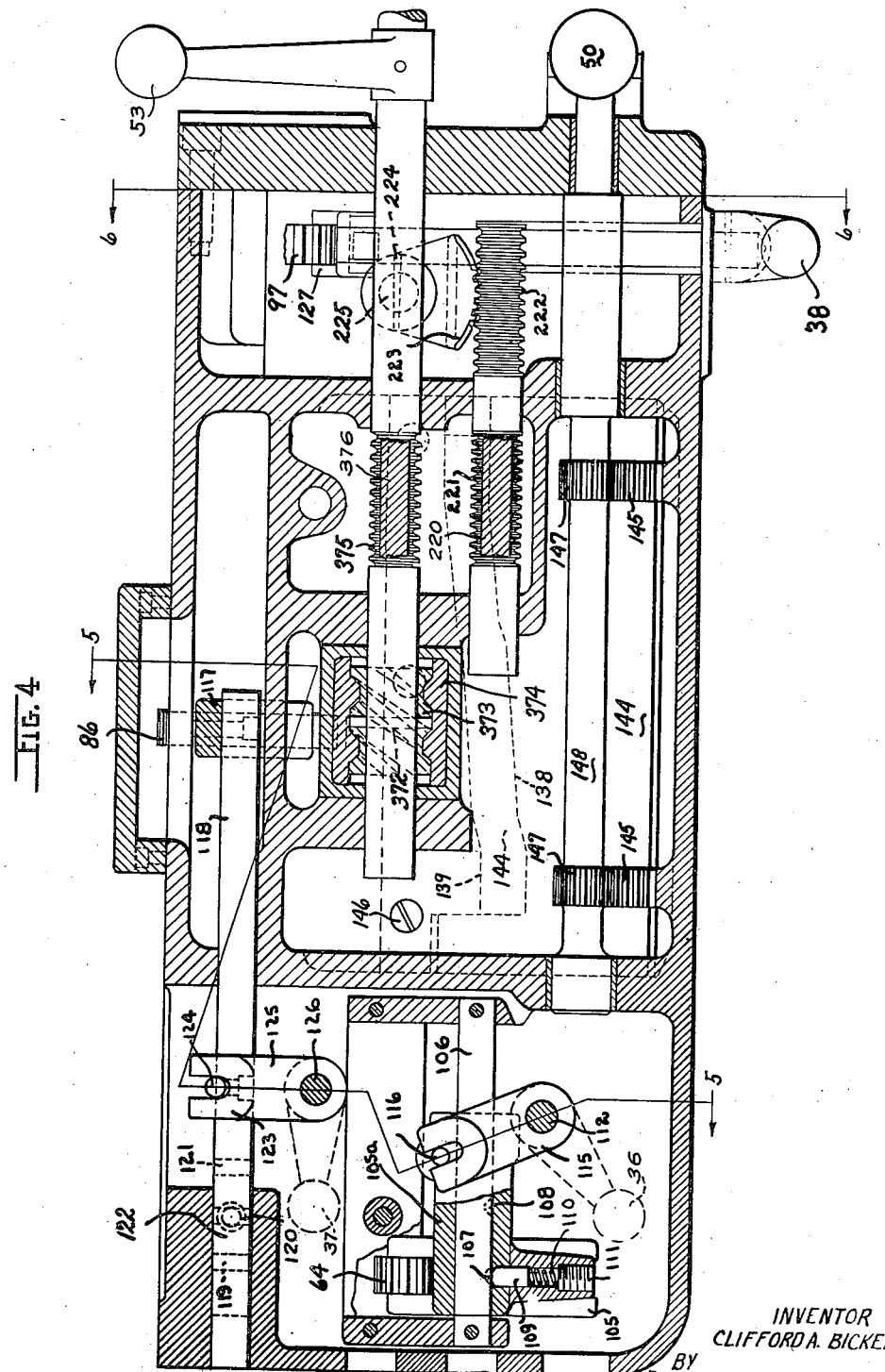

April 24, 1945. C. A. BICKEL 2,374,322
LATHE
Filed Nov. 27, 1940 13 Sheets-Sheet 5
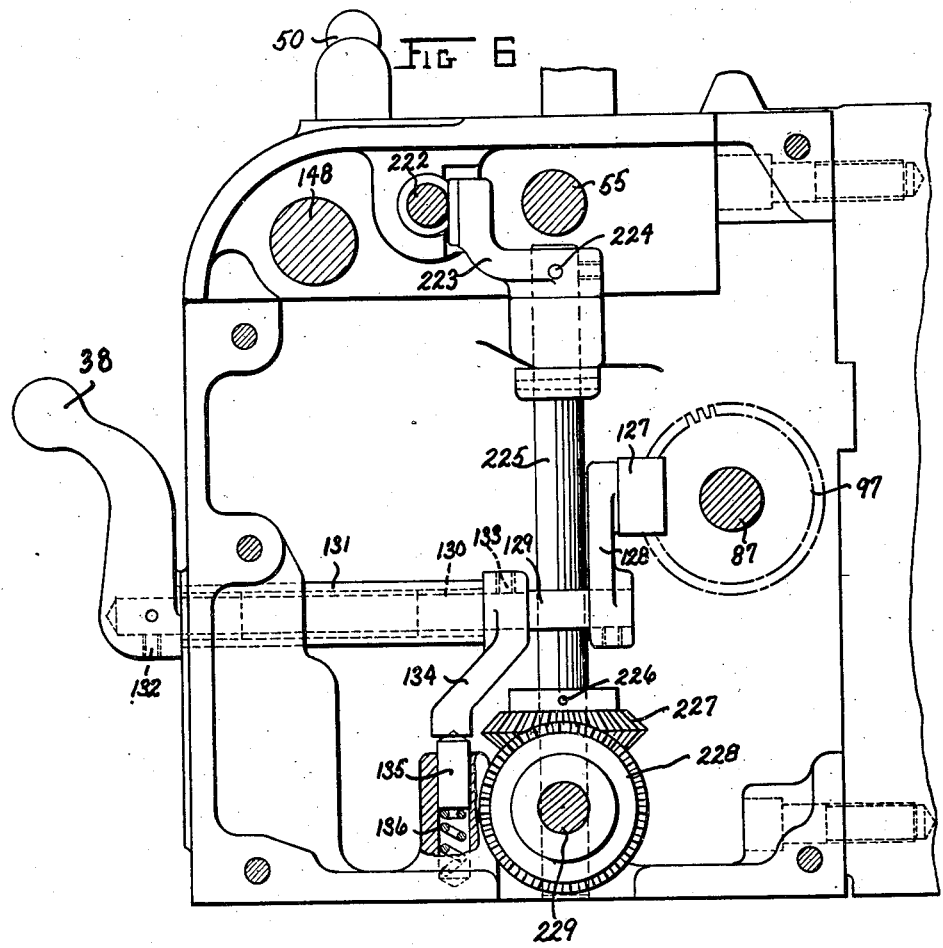
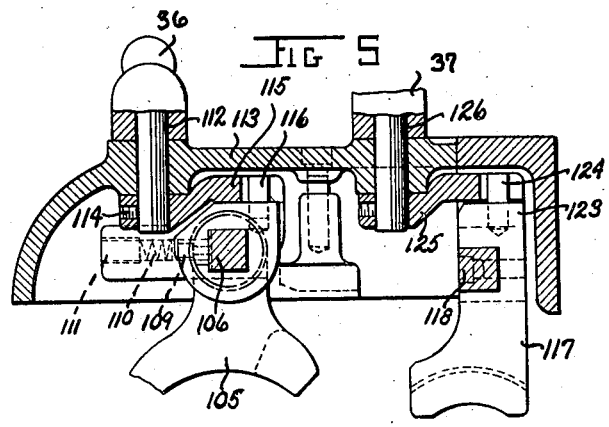
INVENTOR
CLIFFORD A. BICKEL
BY
Toulmin & Toulmin
ATTORNEYS

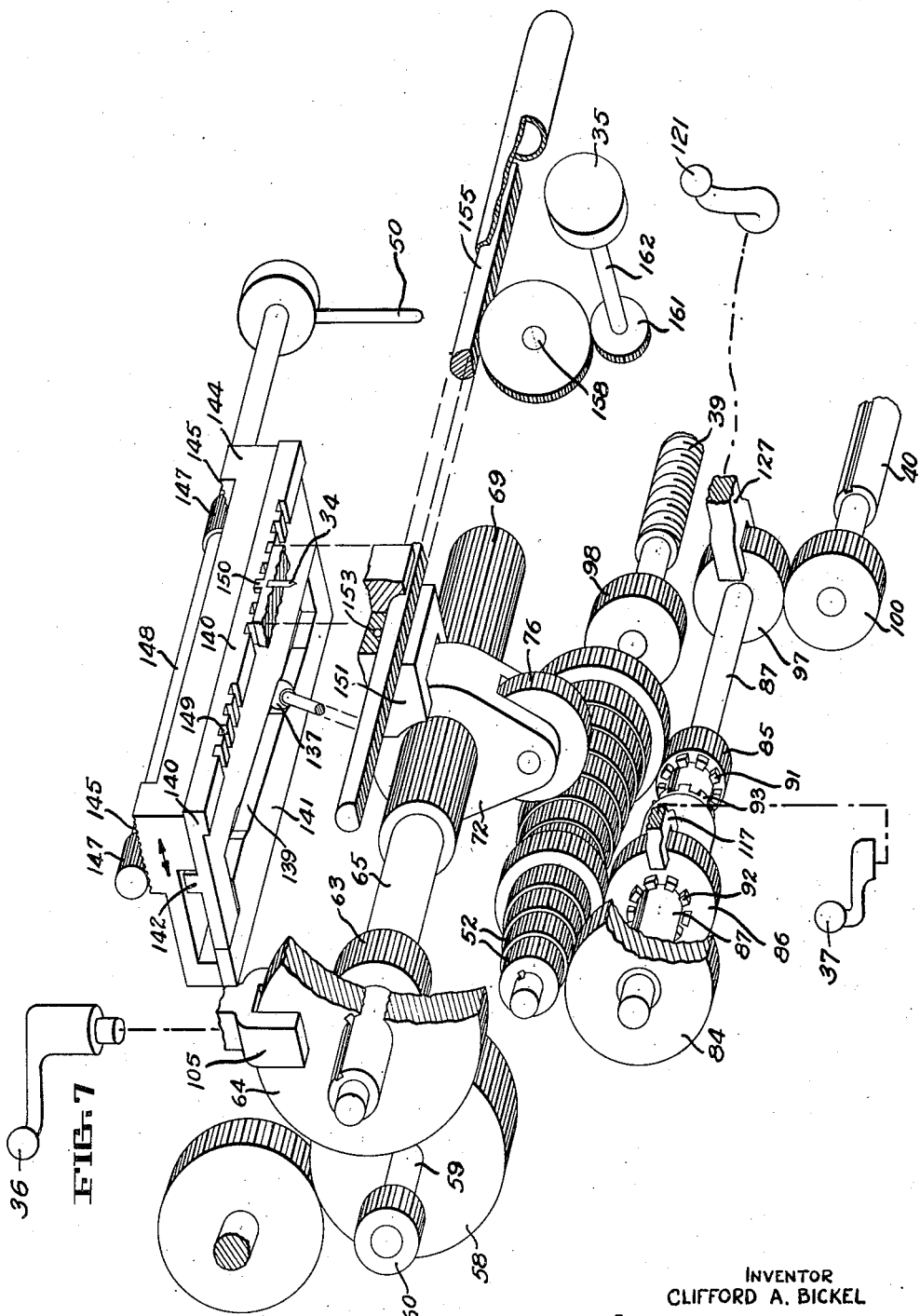

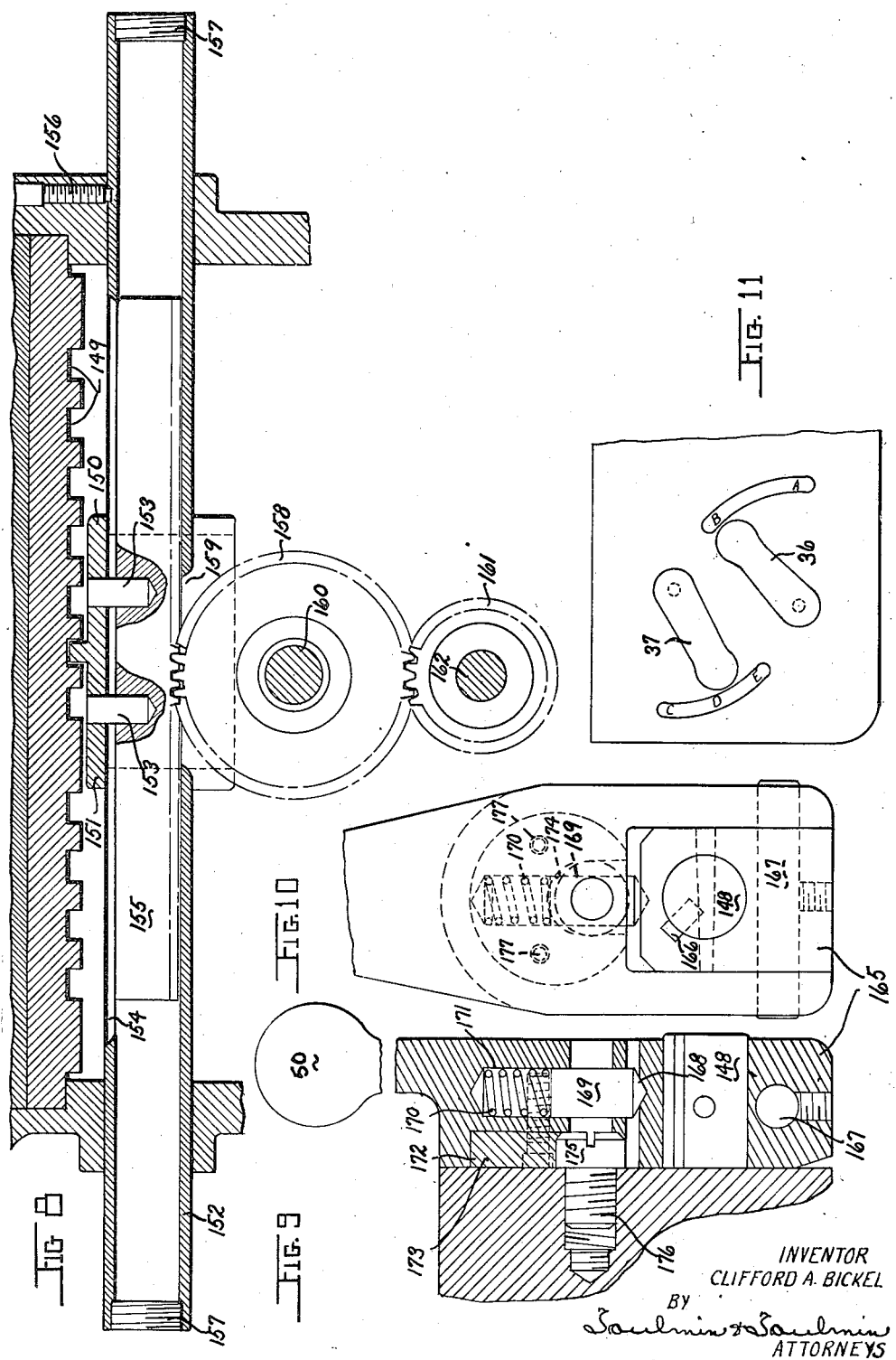

April 24, 1945.  C. A. BICKEL  2,374,322
LATHE
Filed Nov. 27, 1940   13 Sheets-Sheet 8
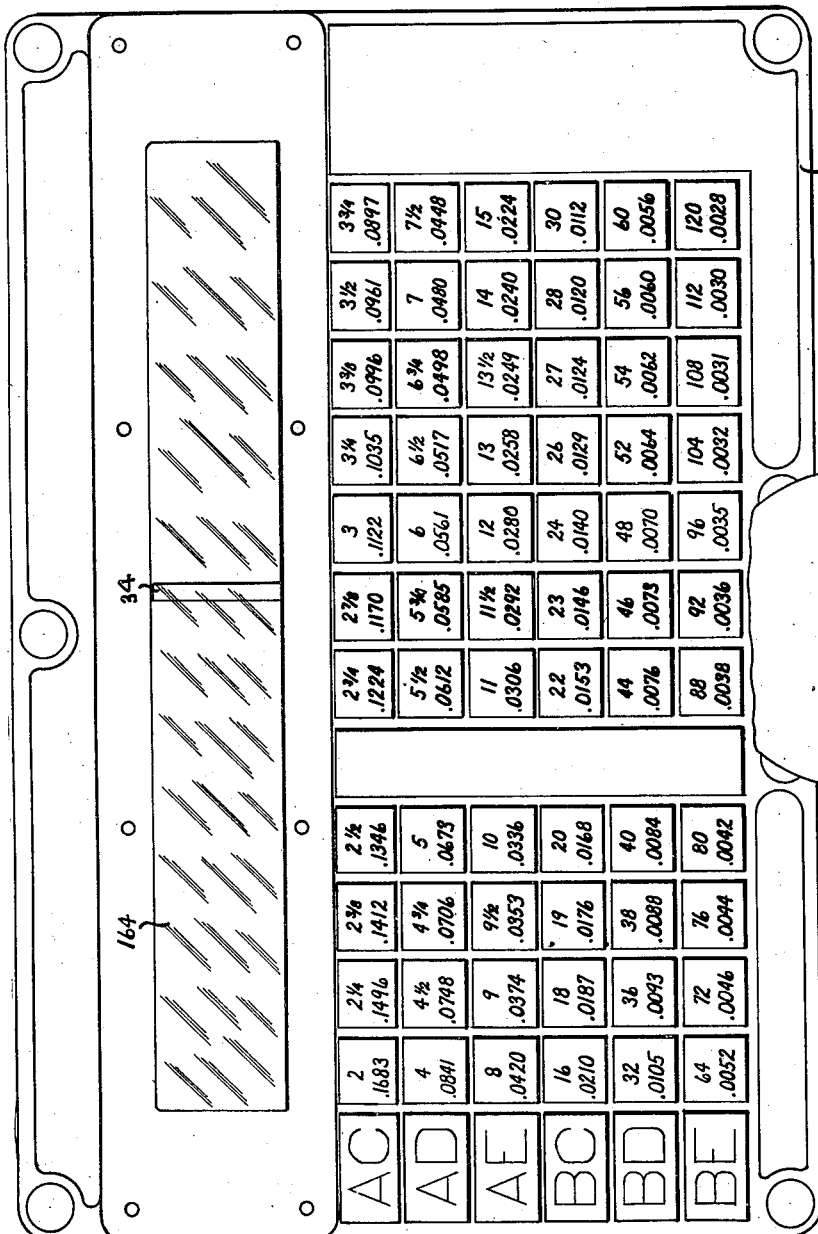
INVENTOR
CLIFFORD A. BICKEL
BY
Toulmin & Toulmin
ATTORNEYS

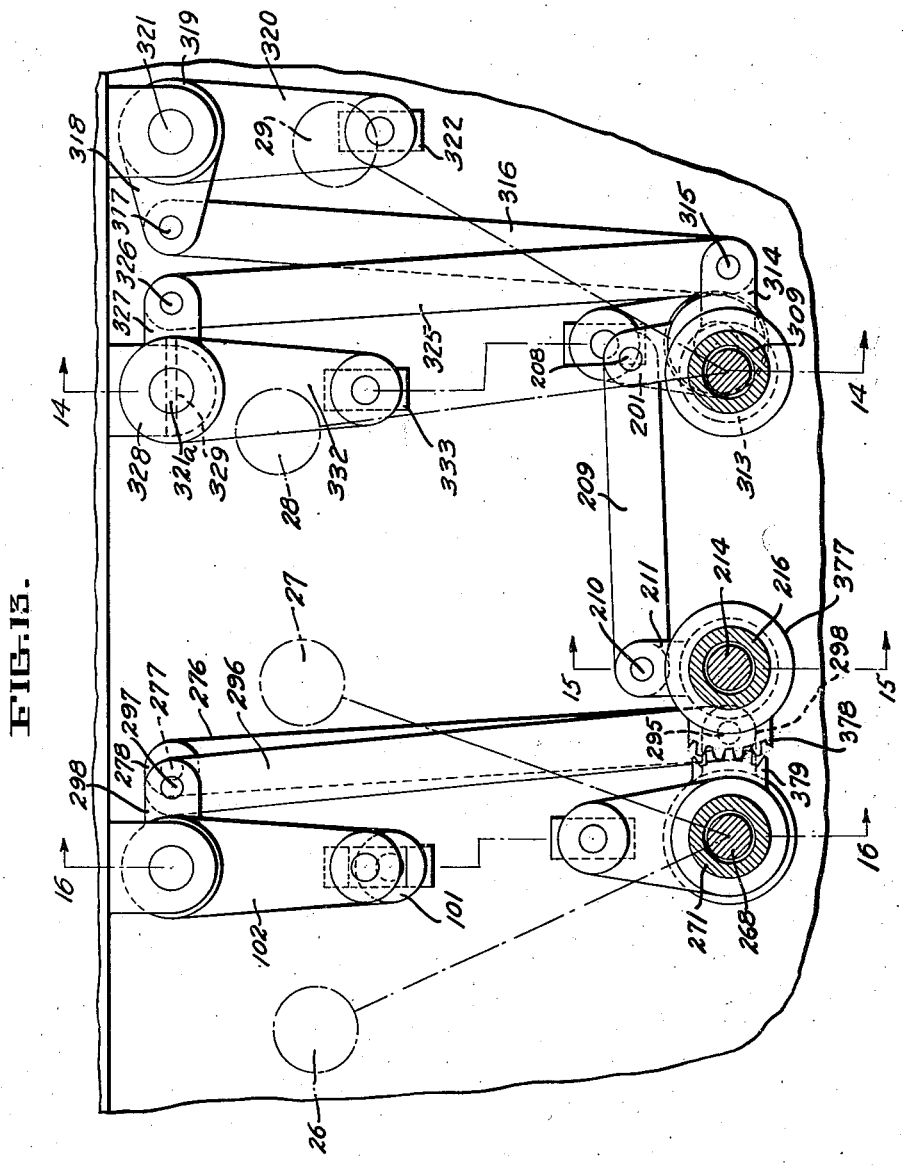

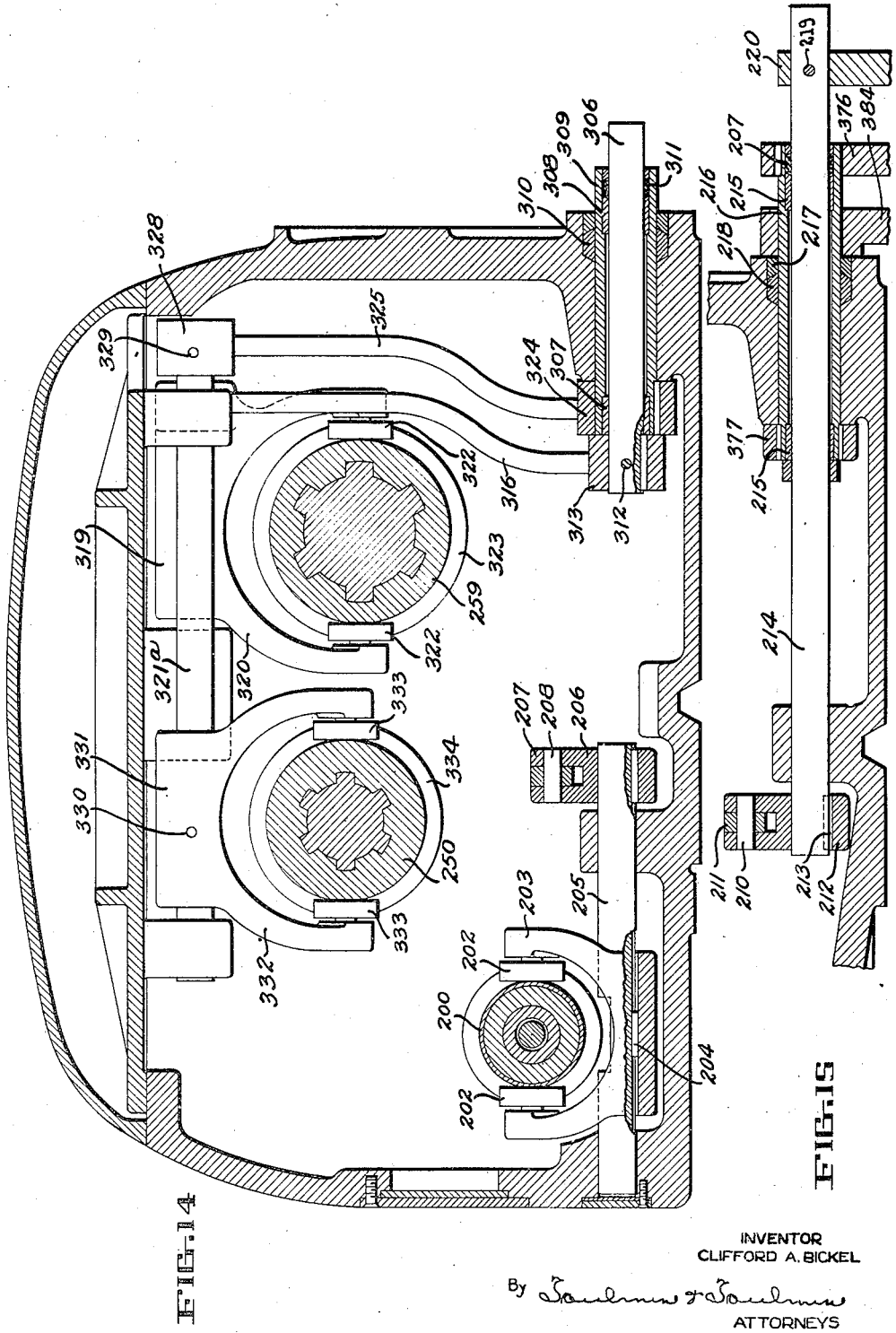

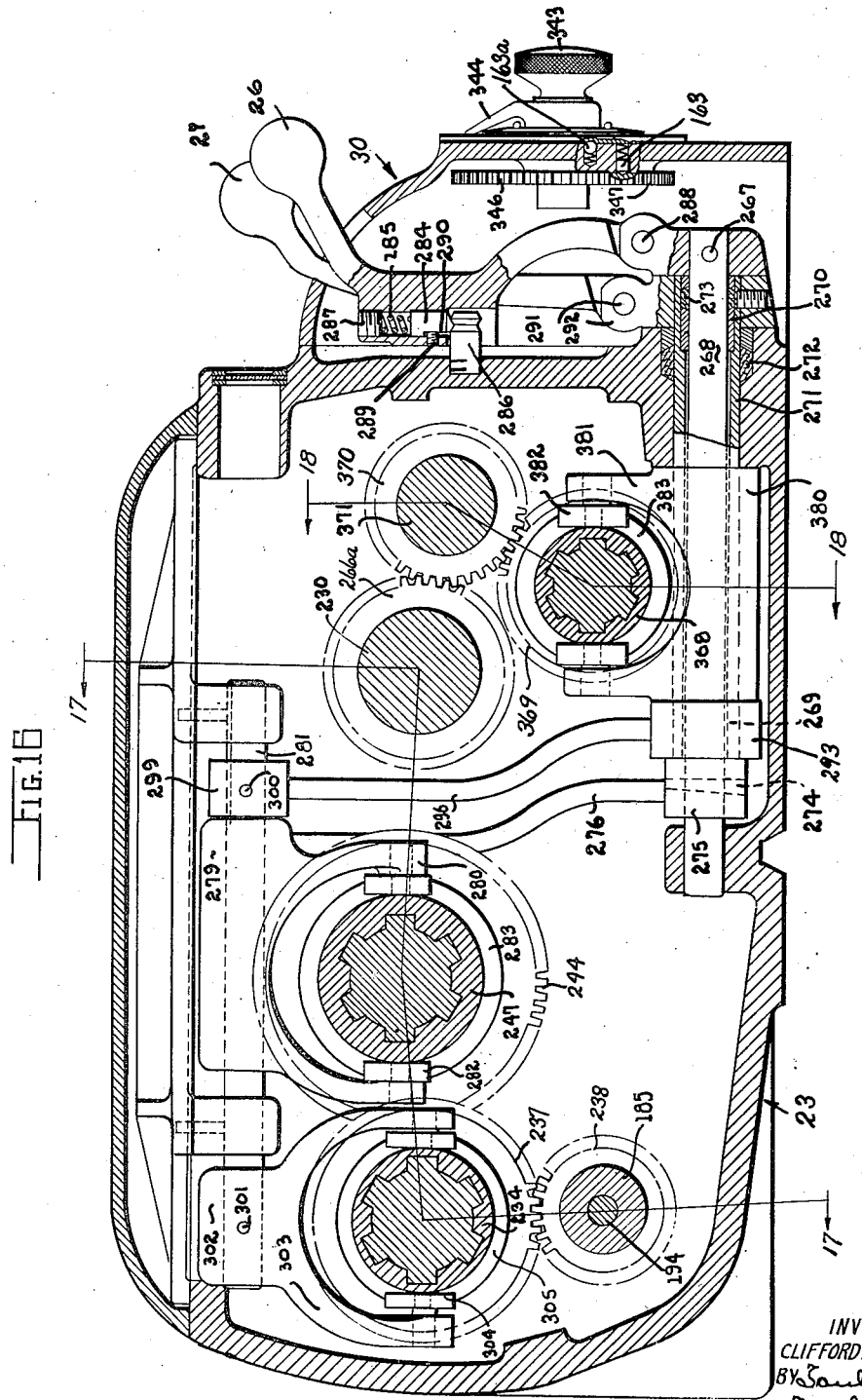

April 24, 1945.  C. A. BICKEL  2,374,322
LATHE
Filed Nov. 27, 1940  13 Sheets-Sheet 12
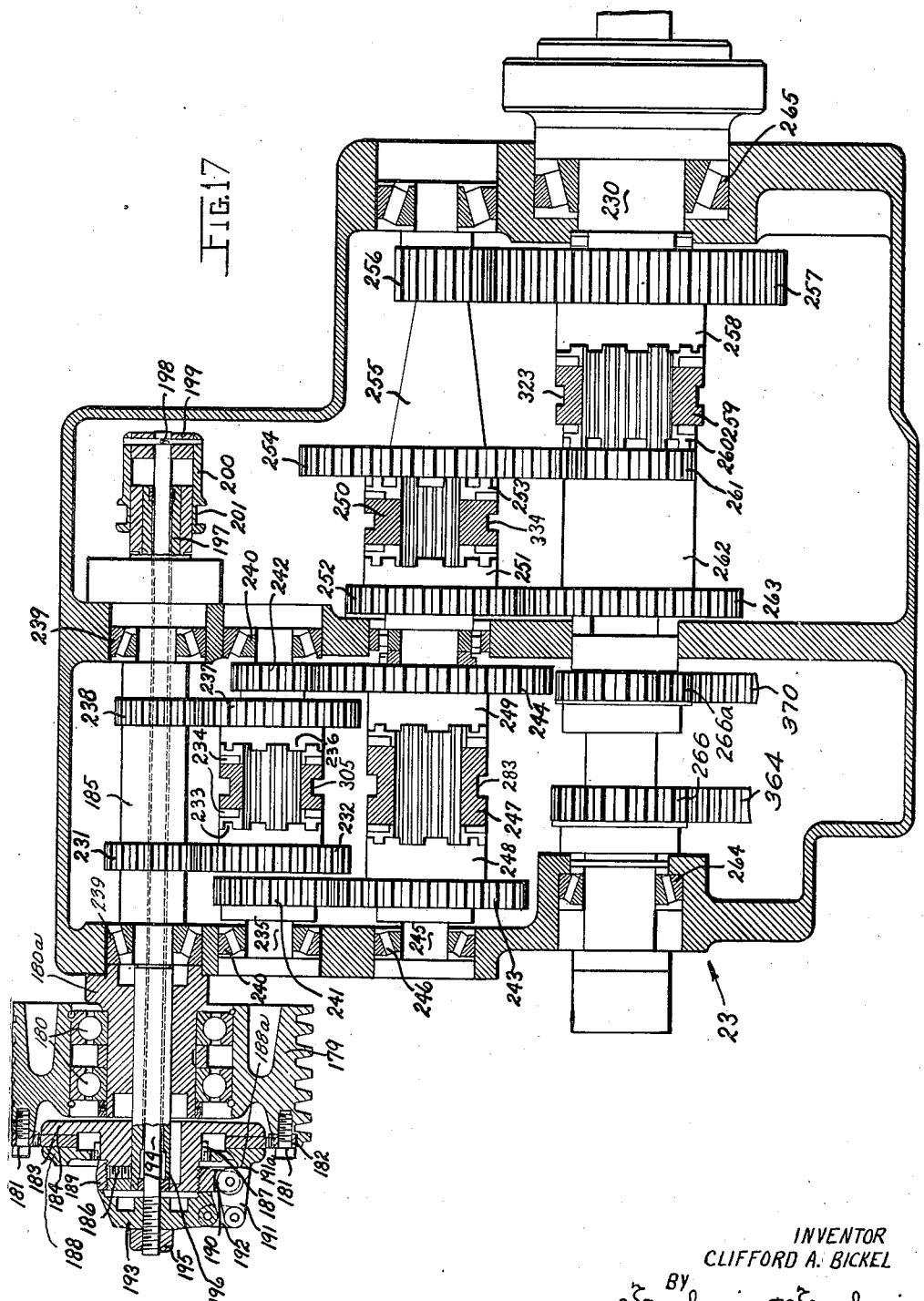
INVENTOR
CLIFFORD A. BICKEL
BY
Toulmin & Toulmin
ATTORNEYS April 24, 1945.   C. A. BICKEL   2,374,322
LATHE
Filed Nov. 27, 1940   13 Sheets-Sheet 13

INVENTOR
CLIFFORD A. BICKEL
BY
Toulmin & Toulmin
ATTORNEY

Patented Apr. 24, 1945

2,374,322

UNITED STATES PATENT OFFICE 2,374,322

LATHE

Clifford A. Bickel, Sidney, Ohio, assignor to The Monarch Machine Tool Company, Sidney, Ohio, a corporation of Ohio Application November 27, 1940, Serial No. 367,446

17 Claims. (Cl. 82—29)

This invention relates to lathes, and in particular to improvements in the controlling systems associated with the head stock and gear box of lathes.

It is an object of the invention to provide a lathe with an improved and simplified transmission control for the speed transmission.

It is another object of the invention to provide a lathe in which all speed adjusting and transmitting shafts, gears and clutches in the head stock and gear box are fully and completely enclosed so as to facilitate lubrication of the movable parts while preventing any undesired particles from entering the head stock and/or gear box.

It is a further object of the invention to provide a gear box in which there is a separate feed rod and lead screw thread casing means, and means to select the drives for the lead screw chasing means and the feed rod, together with novel means of actuating a gear tumbler and selective gearing associated therewith.

Another object of the invention consists in the provision of a lathe having a plurality of cone gears and a tumbler gear cooperating therewith, in which the axial adjustment of the tumbler gear relative to said cone gears may be effected by rotation of a controlling member on the outside of the lathe.

It is another object of the invention to provide a lathe with cone gears and a tumbler gear in which the adjustment of the tumbler gear relative to the cone gears is controlled by a positive locking and unlocking mechanism.

Another object of the invention consists in the provision of a lathe as set forth in the preceding paragraph in which the operation of the unlocking and locking mechanism positively and concomitantly effects movement of the tumbler gear away from and toward the cone gears respectively.

It is also an object of the invention to provide a lathe with a tumbler gear and speed varying cone gears in which the tumbler gear is held in alignment with its respective cone gear by a positive locking mechanism which releases the tumbler gear only when it has been fully disengaged from its cooperating cone gear.

A still further object of the invention consists in the provision of a lathe having a plurality of speed varying cone gears and a tumbler gear adapted selectively to mesh with each cone gear, in which the adjustment of the tumbler gear is controlled so as to allow engagement of the tumbler gear with the selective cone gear only when the latter is in proper alignment with the tumbler gear.

Another object of the invention consists in the provision of a lathe with a tumbler gear and cooperating cone gears in which the locking operation of the tumbler gear is effected in two steps so as first to lock the tumbler gear against axial movement and thereupon against radial movement, whereas the unlocking of the tumbler gear is effected by first releasing the same in radial direction and thereupon in axial direction.

It is another object to provide a lathe with cone gears and a cooperating tumbler gear and a locking mechanism for the latter in which the locking and unlocking of the tumbler gear is effected without causing an undesired torque in the locking mechanism.

A further object consists in the provision of a lathe with a tumbler gear and cooperating cone gears in which the tumbler gear when engaging its respective cone gear occupies a substantially vertical position so as to reduce the lifting component to a minimum, thereby easing the speed changing operation.

Another object of the invention consists in the provision of a lathe having a tumbler gear and cooperating cone gears with simplified translating means for visually indicating the axial movement and position of the tumbler gear relative to the cone gears.

It is another object to provide a lathe with a pointer moving in linear direction for indicating the advance of a feed rod and/or lead screw associated with the lathe.

It is a still further object of the invention to provide a lathe with a feed or speed indicator which moves parallel and in correspondence to the movement of a tumbler gear cooperating with cone gears.

A still further object of the invention consists in the provision of a lathe as set forth in the preceding paragraph in which the feed or speed indicator moves over a rectangular feed and thread chart with equal space for all numbers.

It is also an object to provide a lathe controlling mechanism comprising two cooperating members in which one member may selectively be pushed in axial direction to exert a rotative movement of the second member or may be rotated to exert an axial movement of said second member.

Still another object of the invention consists in the provision of a lathe in which the tool movement is reversible by a screw and nut transmission adapted to convert a pushing movement of the screw into a rotative movement of the nut and vice versa.

It is a still further object of the invention to provide a lathe in which at least some of the shafts in the gear box are journalled in anti-friction bearings of the self-oiling type.

These and other objects and advantages of the invention will appear more clearly from the following specification in connection with the accompanying drawings, in which:

Figure 1 shows a front view of the lathe according to the invention.

Figure 3 is a section along the line 3—3 of Figure 2.

Figure 4 is a section along the line 4—4 of Figure 2.

Figure 5 is a section along the line 5—5 of Figure 4.

Figure 6 is a section taken along the line 6—6 of Figure 4.

Figure 7 is a perspective view showing the locking and adjusting mechanism for the tumbler gear with regard to the cone gears in the gear box.

Figure 8 shows a detail of the locking mechanism of Figure 7.

Figure 9 is a section through a handle associated with the locking and unlocking mechanism for the tumbler gear.

Figure 10 is a side view of the handle shown in Figure 9.

Figure 11 shows controlling levers associated with the speed selecting mechanism.

Figure 12 shows a chart used in connection with the spindle speed selector mechanism and tumbler adjusting means according to the invention.

Figure 13 shows a view of the linkage system in the headstock after the removal of the front plate thereof.

Figure 14 is a section along the line 14—14 of Figure 13.

Figure 15 is a section along the line 15—15 of Figure 13.

Figure 16 is a section along the line 16—16 of Figure 13.

Figure 17 is a section along the line 17—17 of Figure 16.

GENERAL ARRANGEMENT

Figure 4A:
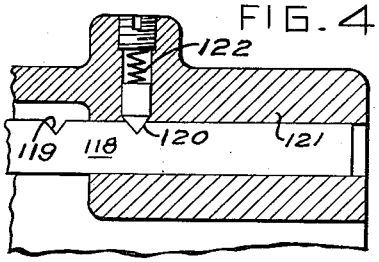
Figure 4a is a section along the line 4a—4a of Figure 4.

The lathe according to the present invention comprises a cabinet leg 21 with a rapid transverse drive compartment 22 which houses the rapid transverse drive motor (not shown). The rapid transverse drive motor drives, by means of a gear transmission, the spindle in the head stock 23 which in its turn is adapted to rotate a work piece between the centering point 24 and the centering point 25. The speed gear mechanism in the head stock 23 is controlled by the levers 26, 27, 28 and 29 which are adapted to be set by the operator in correspondence to the desired speed. 30 designates a computing dial for determining the spindle speed when the diameter of the work piece to be machined and the surface speed have been determined.

Driven by the spindle in the head stock through the usual end gearing is the gear system in the gear box 31 which is connected to the side of the bed 32. Mounted on the outside of the gear box 31 is a chart 33 which cooperates with a pointer 34 for adjusting and selecting the desired feed or thread. The pointer 34 is operable by rotation of of the knob 35. While the pointer 34 determines the vertical row on the chart, the levers 36 and 37 arranged on top of the gear box 31 select the horizontal row on the chart 33.

The gear box 31 furthermore carries on its outside a handle 38 for selecting the drive of the lead screw 39 or feed rod 40. The speed of the lead screw or feed rod is determined by the selection of the gears in the gear box.

The lathe is provided in the usual manner with an apron 41 which is a part of the carriage 47 supporting the cross slide 42 which in its turn carries a swivel 43 and top slide 44. The lever 45 controls the longitudinal feed while the lever 46 controls the cross feed. The carriage 47 is either automatically advanced or retracted by the feed rod or lead screw or may be manually advanced or retracted by operation of the handwheel 48. The motor for driving the lathe may be connected with or disengaged from the gear system in the lathe by operation of one of the start-stop handles 49.

The handle 50 serves to unlock the tumbler gear idler 76 (see Figures 4 and 7) for horizontal movement along the cone gears 52 and also disengages the tumbler gear from that cone gear with which it happens to be in mesh. The horizontal movement of the tumbler is effected by rotation of the knob 35. The position of the handle 53 determines whether the lead screw or feed rod is driven in forward or reverse direction. Operation of the lever 54 is adapted to cause closure of the conventional half nuts on the lead screw for engaging the carriage with the lead screw.

If, instead of the drive by the lead screw, it is desired to drive the carriage from the feed rod, the lever 45 or 46 is operated depending on whether longitudinal or cross feed is required. The lead screw reverse rod 55 carries a stop collar 56 which, in cooperation with the knurled adjusting nuts 57, is adapted to stop the advancing movement of the tool carrying the carriage 47.

GEAR BOX

*Arrangement of gear system*

As previously mentioned, the gear box 31 houses the gear system for determining the speed of the lead screw and feed rod and, thereby, of the feed of the tool supported by the carriage 47.

Referring to Figures 3 and 7, 58 is the input gear which is keyed to the input shaft 59 and meshes with one of the quadrant gears in the rear or at the end of the lathe bed. Keyed to or integral with the input shaft 59 is a gear 60. The shaft 59 is journalled on one end in an anti-friction bearing 61 of the self-oiling type, while the other end of the input shaft 59 is journalled in an anti-friction bearing 62. The gears 58 and 60 are adapted to mesh with gears 63 and 64 respectively, which form the so-called cluster gear. The gears 63 and 64 are connected with each other and keyed to the shaft 65 so as to be slidable as a unit thereon.

When the gears 64, 63 occupy the position shown in Figure 3, the gear 64 is in mesh with the gear 60, while shifting movement of the gears 64 and 63 toward the right (with regard to Figure 3) causes the gear 64 to disengage the gear 60, while the gear 63 will mesh with the gear 58.

The shaft 65 which is journalled in a self-oiling anti-friction bearing 66 and in anti-friction bearings 67, 68 has rigidly connected or integral therewith a gear 69. Mounted in the gear box 31 and enclosing the gear 69 is a sleeve 70 which has an opening 71 through a large part of its length. Slidably mounted on and shiftable about the sleeve 70 is a fork shaped arm or tumbler 72 carrying a pin 73. The pin 73 is held in its position by a set screw 74 and supports an anti-friction bearing 75 on which is journalled the tumbler gear idler 76.

The tumbler gear idler 76 meshes with the gear 69 and is adapted selectively to be engaged with and disengaged from the cone gears 52 supported by and keyed to the cone gear shaft 78.

The cone gear shaft 78 is journalled in anti-friction bearings 79 and 80. In addition to the cone gears 52, the cone gear shaft 78 has also keyed thereon three gears 81, 82 and 83, of which the gears 81 and 83 continuously mesh with the free running clutch gear 84 and the free running clutch gear 85 respectively, while the gear 82 is adapted to mesh with the clutch gear 86. While the clutch gears 84 and 85 are freely rotatable about the cone clutch shaft 87 journalled in anti-friction bearings 88 and 89, they are held in their position by any convenient means and are provided with jaws 90, 91 respectively, adapted to engage the jaws 92 or 93 of the clutch gear 86, depending on whether the clutch gear 86 is shifted on the shaft 87 toward the left or the right with regard to Figure 3. The clutch gear 86 is keyed to the shaft 87 by means of a key 94 so that rotation of the shaft 87 will cause the clutch gear 86 to rotate.

As will be obvious from the above, the provision of the clutch gear 86 and the free running clutch gears 84 and 85 afford three different speeds depending on whether the clutch gear 86 is in the position of Figure 3 or in engagement with either clutch gear 84 or clutch gear 85. In the first instance the drive of the cone gear shaft 78 is transmitted through gear 82 and clutch gear 86 directly to the shaft 87. When the jaws 90 and 92 of the clutch gears 84 and 86 engage each other, the drive of the cone gear shaft 78 follows the gear 81, the free running clutch gear 84 and the clutch gear 86 to the shaft 87. When the jaws 93 and 91 of the gears 86 and 85 engage each other, the drive of the cone gear shaft 78 is transmitted through gears 83, 85 and 86 to the shaft 87.

The cone clutch shaft 87 is supported at its outer end by a bushing 95 in the feed rod plate or housing cover 96. Slidably mounted on and keyed to the shaft 87 between the bearing 89 and the bushing 95 is a slip gear 97 which is movable so as selectively to engage a gear 98 keyed or otherwise connected to the lead screw 39 or a gear 100 keyed or connected in any convenient manner to the feed rod 40. The end of the lead screw 39 adjacent the lead screw gear 98 is journalled in anti-friction bearings 102 spaced from each other by a bushing 103. A packing 104 prevents leakage of oil toward the outside. The speed of the feed rod or lead screw is determined as follows:

As previously mentioned, the gear 58, keyed to the input shaft 59, is driven by a motor through a gear train so that, depending on the position of the cluster gear 63, 64, the rotated movement of the input shaft 59 is conveyed to the shaft 65 either through gear 63 or 64. Supposing that the tumbler gear idler 76 is in engagement with one of the cone gears 52, the rotated movement of the shaft 65 is conveyed to the respective cone gear 52 through the gear 69 and the tumbler gear idler 76.

If the clutch gear 86 occupies the position shown in Figure 3, the cone shaft 78 drives through the gear 82, the clutch gear 86 which in its turn drives the slip gear 97 by means of the shaft 87. Since, in the position shown in Figure 3, the slip gear 97 engages the feed rod gear 100, rotation of the slip gear 97 drives the feed rod 40. If it is intended to drive the lead screw 39 instead of the feed rod 40, the slip gear 97 is to be brought into engagement with the lead screw gear 98. In case the jaws 92 of the clutch gear 86 engage the jaws 90 of the free running clutch gear 84, the cone gear shaft 78 drives through gear 81 and the gear 84 which imparts its rotative movement through the clutch gear 86 to the shaft 87. Similarly, the cone gear shaft 78 drives through its gear 83, the free running clutch 85, the clutch gear 86 and the shaft 87, if the jaws 93 of the clutch gear 86 engage the jaws 91 of the clutch gear 85.

*Shifting movement of cluster gears 63, 64*

The side faces of the gear 64 are engaged by a fork 105 (see Figures 4 and 7), which is slidably mounted on a bar 106 with its sleeve portion 105a and positions the gears 63 and 64 relative to the gears 58 and 60. The bar 106 is rigidly connected at its ends to the gear box casing and has two notches 107 and 108 therein adapted selectively to be engaged by a detent plunger 109 for retaining the cluster gear 63, 64 in the desired position.

The detent plunger 109 is continuously urged into engagement with one of the notches 107, 108 by means of a spring 110, the thrust of which is adjustable by a set screw 111.

Figure 4B:
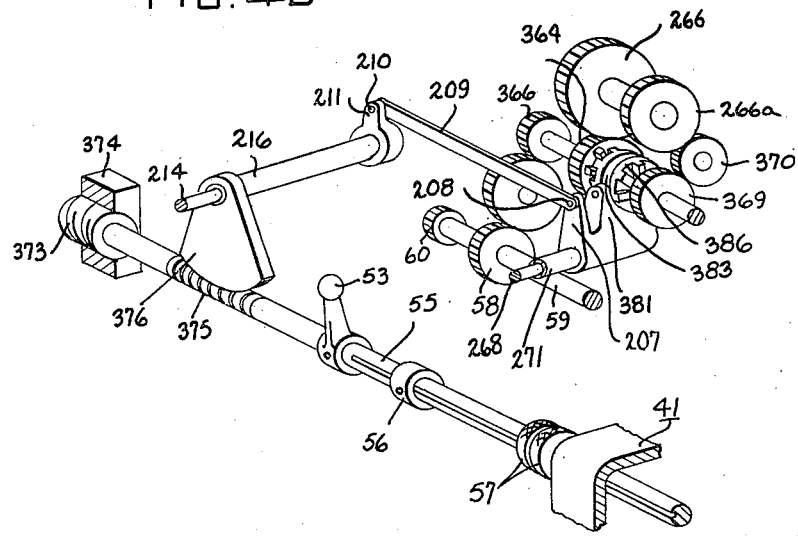
Figure 4b is a skeleton view showing the driving connection between the spindle gearing and a portion of Figure 4.

The fork 105 for shifting the cluster gear 63, 64 is moved in one or the other direction by operation of the handle 36 which is pinned to the shaft 112 (see Figures 4 and 5). The shaft 112 is shiftably mounted in the housing cover 113 and rigidly connected in any convenient manner, for instance, by a screw 114 with a fork 115. The fork 115 engages a pin 116 which is rigidly connected with the sleeve 105a of the fork 105. Consequently, shifting movement of the handle 36 causes a partial rotation of the shaft 112 which in its turn shifts the fork 115, which latter converts, by its engagement with pin 116, the rotative movement of the shaft 112 into a longitudinal sliding movement of the fork 105, 105a so as to cause the gear 64 of the cluster gear to mesh with the gear 60 or to cause engagement of the gear 63, pertaining to the cluster gear, with the gear 58.

The two possible positions of the handle 36 corresponding to the two possible positions of the cluster gear 63, 64, are indicated A and B (Figure 11). The position of the handle 36, relative to the handle 37, definitely determines the horizontal row on the chart 33 which is to be combined with the vertical row indicated by the pointer 34, as will be fully described later.

*Shifting movement of clutch gear 86*

The side faces of the clutch gear 86 are engaged by a fork 117 which is rigidly connected to the slide bar 118 (see Figures 4 and 5). The path of the slide bar 118 is confined by a rectangular groove in the gear box casing. In correspondence to the three possible positions of the clutch gear 86, the slide bar 118 is provided with three notches 119, 120 and 121, milled in one of the faces of the slide bar. The notches 119, 120 and 121 are selectively adapted to be engaged by a detent assembly 122. The detent assembly 122 is substantially similar to the detent assembly comprising the parts 109, 110 and 111, for maintaining the position of the slide bar 106.

Rigidly connected to the slide bar 118 is a block 123 with a pin 124. The pin 124 is engaged by a fork 125 which is rigidly connected to the shaft 126 journalled in the housing cover 113. The outward end of the shaft 126 has rigidly connected thereto the handle 37. Consequently, shifting movement of the handle 37 causes a shifting movement of the shaft 126 which, due to the fork 125 engaging the pin 124, converts the rotative movement of the shaft 126 into a longitudinal sliding movement of the pin 124, thereby causing the bar 118, rigidly connected with the block 123 which latter carries the pin 124, to move in one of its three possible positions in which it is held by means of the detent assembly 122.

The three different positions of the handle 37 are marked C, D and E (Figure 11) and correspond to the three different speeds in accordance with the three positions of clutch gear 86. The positions C, D and E serve for selecting, in cooperation with the handle 36, the horizontal row on the chart 33, which will be combined with the vertical row on the chart selected by the pointer 34. The actual selection of the horizontal rows will be described in detail later.

*Shifting movement of slip gear 97*

The side faces of the slip gear 97 are engaged by the forked block 127 (see Figures 4 and 6), which swivels in the lever 128 pinned or otherwise keyed to the shaft 129. The shaft 129 is journalled in bushings 130 which are carried by a tube 131 pressed into the gear box casing. The outer end of the shaft 129 has keyed thereon, for instance by means of a screw 132, the handle 38.

Also keyed to the shaft 129, for instance by a pin 133, is a detent segment 134 adapted to be engaged by a detent plunger 135 which is continuously urged into engagement with the segment 134 by means of a spring 136, the thrust of which, if desired, may be varied in a manner known per se by means of a set screw (not shown in the drawings).

Shifting operation of the handle 38 in one or the other direction therefore causes a partial rotation of the shaft 129 and the lever 128 connected thereto which, due to the swivel connection of the forked block 127 with the lever 128, shifts the slip gear 97 in one or the other direction so as to bring the same into engagement either with the feed screw gear 100 or lead screw gear 98.

*Adjustment of tumbler gear idler 76*

The control of the tumbler and tumbler gear idler has always proved difficult in a totally enclosed gear box, which fact is responsible for the large opening in most lathe feed and thread gear boxes. However the mechanism which will presently be described provides a means of controlling these gear box elements without the necessity of any open slots or bores.

Figure 2:
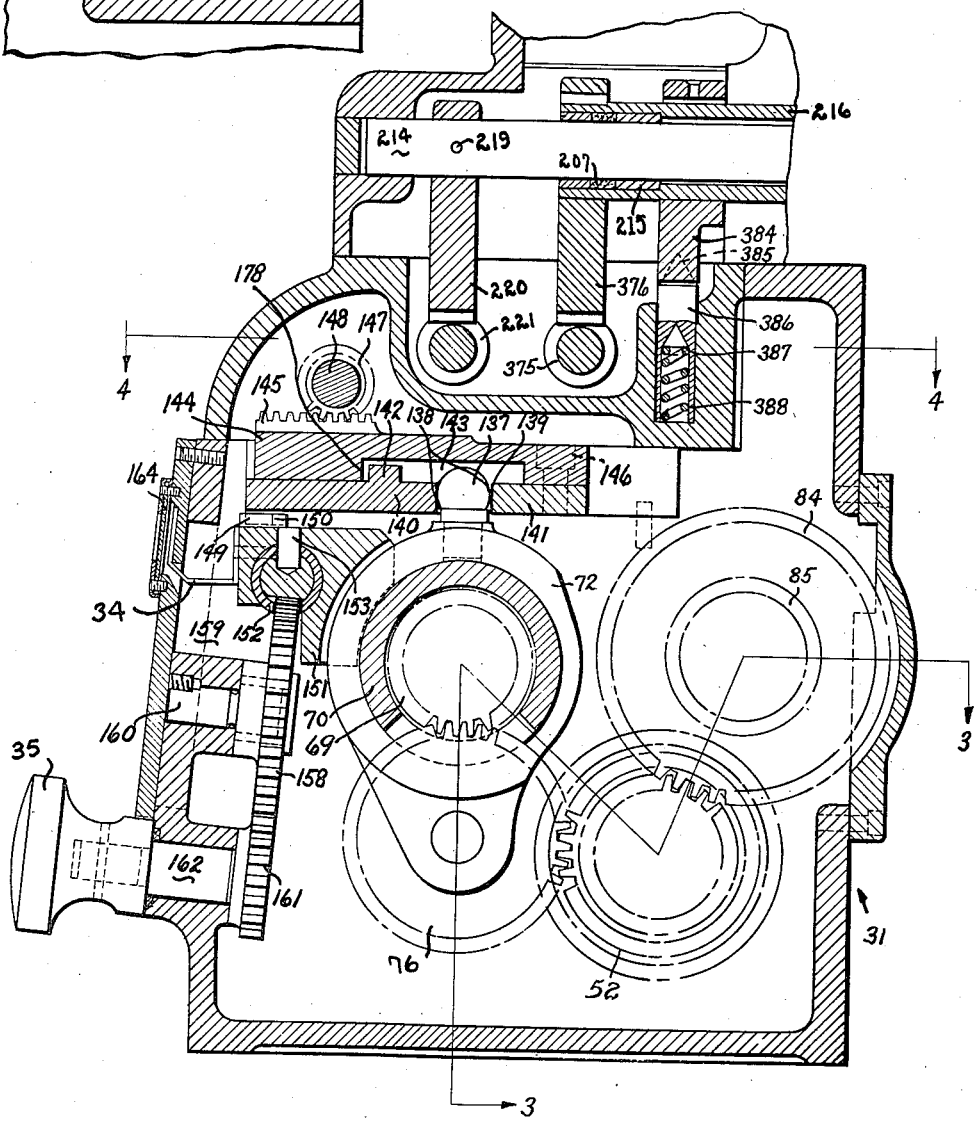
Figure 2 is a section along the line 2—2 of Figure 1.

As will be seen from Figures 2 and 7, the tumbler 72 has rigidly connected therewith a ball stud 137 which is adapted to cooperate with the cam surfaces 138 and 139 of the cam plates 140 and 141. The cam surfaces 138 and 139 are shaped in correspondence with the diameters of the cone gears so that the tumbler gear idler 76 is always in engagement with its respective cone gear when the ball stud 137 is clamped between the cam surfaces 138 and 139.

The cam plates 140 and 141 are slidably supported by any convenient means and adapted to be spaced from or moved toward each other. The cam plate 140 has a protruding portion 142, which is adapted to cooperate with a recess 143 in the rack slide 144 carrying racks 145 on each end. The rack slide 144 is slidably mounted on the cam plate 140 but is rigidly connected with the cam plate 141, for instance by means of a screw 146. When the ball stud 137 is in its clamped position, the protruding portion 142 is spaced from the adjacent end wall portion of the recess 143.

Meshing with the racks 145 are pinions 147 integral with or rigidly connected to the pinion shaft 148. The pinion shaft 148 has keyed thereto the handle 50. The bottom portion of the cam plate 140 is provided with notches 149 adapted to be engaged by a correspondingly shaped jaw 150 supported by and connected to the selector shoe 151. The selector shoe 151 which engages the side faces of the tumbler 72 is slidably mounted on the tubular slide 152, having pins 153 projecting through a slot 154 (see Figure 8) in the greater part of the length of the slide 152 and connected to the rack rod 155. The tubular slide 152 is held stationary in the gear box casing by any convenient means, for instance by screws 156. Furthermore, the ends of the tubular slide 152 are plugged by plugs 157.

The rack rod 155 engages the teeth of an idler 158 through another slot 159 in the tubular slide 152. The idler 158 which is rotatably mounted about the stud 160, connected to and supported by the gear box casing, engages the pinion gear 161 which is keyed or otherwise rigidly connected to the shaft 162 and, thereby, to the knob 35.

Connected with the selector shoe 151 is the pointer 34 which is movable beneath and along a glass cover 164. This pointer, as previously mentioned, moves relative to the columns on the chart 33 which, if desired, may be mounted under a separate glass cover or under a glass cover covering both the pointer and the chart. In the latter instance, the pointer 34 may extend across the entire chart.

To facilitate the shifting and locking of the pinion shaft 148, a locking device is provided between the handle 50 and the pinion shaft 148 (see Figures 9 and 10). This locking device comprises a swivel block 165 keyed to the outer end of the pinion shaft by means of a key 166 and connected to the handle 50 by means of a swivel pin 167, so that the handle 50 may be swung about the axis of the pin 167. The swivel block 165 has an indentation 168 in its upper surface which is adapted to be engaged by a detent plunger 169 continuously urged against the swivel block 165 by a spring 170 which is located in a recess 171 of the handle 50. The handle 50 furthermore comprises a recess 172 to receive a hardened plate 173 with a slot 174 therein for engaging the head 175 of the screw 176 threaded into the gear box casing. The plate 173 is connected with the handle 50 by means of screws 177. By pulling the knob of the handle 50 away from the screw 176, the locking plate 173 disengages the head 175 so that the handle 50 is free to be rotated transverse to the axis of the swivel pin 167 for rotating the pinion shaft 148.

Supposing that the tumbler gear idler 76 is in engagement with one of the cone gears 52 and that it is now desired to change the speed of the feed rod or lead screw by means of shifting the tumbler gear idler 76, the operator first actuates the handle 50 by pulling the same away from the screw 176 so as to disengage the plate 173 from the head 175. Now the handle 50 is rotated transverse to the axis of the swivel pin 167 so as to rotate the pinion shaft 148. Rotation of the pinion shaft 148 and, thereby, of the pinions 147 causes the rack slide 144 to move so that the cam plate 141 connected thereto moves away from the ball stud 137. When the rack slide 144 has moved by such a distance that the end surface 178 of the recess 143 engages the protruding portion 142 of the cam plate 140, further movement of the rack slide 144 also moves the cam plate 140 in the same direction as the cam plate 141 so that the ball stud 137 will be shifted by the movement of the cam plate 140 in the direction of said movement. The shifting movement of the ball stud 137 connected to the tumbler 72 rotates the latter so as to disengage the tumbler gear idler 76 from its respective cone gear. It should, however, be noted that the movement of the tumbler 72 in the direction of the longitudinal axis of the shaft 65 is prevented by the engagement of the jaw 150 with the respective notch 149 until the rack slide 144 has reached its outermost position in which the jaw 150 is disengaged from its respective notch 149 in the rack slide 144. This outermost position of the rack slide 144 may be indicated by a stop on the gear box casing against which the handle 50 may abut. Now the knob 35 is rotated, thereby rotating the gears 161 and 158, which latter meshes with the rack rod 155 and causes the same to move the selector shoe 151 in one or the other direction.

Inasmuch as the pointer 34 is connected to the selector shoe 151, the position of the latter, relative to the columns on the chart 33, indicates the position of the tumbler gear idler 76 relative to the cone gears. As soon as the tumbler gear 76 has been brought into alignment with the desired cone gear 52, the knob 35 is released, while the handle 50 is actuated so as to rotate the pinions 147 in opposite direction for returning the cam plates 140 and 141 to their previous position in which both cam plates engage the ball stud 137 and clamp the same between the cam surfaces 138 and 139.

As previously mentioned, the proper spacing of the tumbler gear 76 from the cone gears 52 to allow free shifting movement of the tumbler gear 76 relative to the cone gears 52, is effected by the shape of the cam surfaces 138 and 139. The adjusting operation of the tumbler gear 76 and the speed change effected thereby is now completed, and to prevent accidental movement of the pinions 147, the handle 50 is shifted toward the screw 176 until the plate 173 engages the screw head 175, thereby locking the handle 50 in its position.

It will be noted that even an accidental partial movement of the rack slide 144 will not cause any change in the position of the tumbler gear 76, since it still will be locked, due to the engagement of the jaw 150 with its adjacent notch 149 in the rack slide 144.

As will be clear from the above, the tumbler gear shifting mechanism according to the present invention allows shifting movement of the tumbler gear without having a slot or an open bore in the gear box. A further advantage of the tumbler gear shifting mechanism according to the invention consists in that a positive locking and unlocking mechanism is provided for locking and unlocking the tumbler gear. The locking notches 149, cooperating with the jaw 150, serve the further purpose of properly aligning the tumbler gear 76 with its respective cone gear 52. Unless the tumbler gear 76 is in proper alignment with its respective cone gear, the jaw 150 is in misalignment with the adjacent locking notch 149 and prevents the return of the rack slide 144 and cam plate 141 into its locking position; in other words, the tumbler gear 76 cannot be brought into engagement with the desired cone gear, unless it has reached its proper position.

It will further be clear from the above description that a positive disengagement of the tumbler gear from its respective cone gear is effected concomitantly with the unlocking of the ball stud 137 and, unless the tumbler gear has been fully disengaged from its respective cone gear, the jaw 150 will still be in engagement with its adjacent locking notch 149, thereby preventing movement of the tumbler 72 in the direction of the axis of the shaft 65.

In this connection it may also be mentioned that, due to the fact that the pinions 147, which are rigidly connected to the pinion shaft 148, engage with a rack at each end of the rack slide 144, no torque can be imparted to the rack slide 144 by the shifting movement of the pinion shaft 148. Consequently, also no undesired torque will be imparted to the tumbler 72 during its shifting operation.

Due to the fact that the shifting mechanism for the tumbler 72 is subdivided into a mechanism for locking and unlocking the tumbler 72 and for spacing the same from the cone gears, and into a mechanism for moving the tumbler 72 in the direction of the shaft 65, it has been made possible to translate the movement of the selector shoe 151 into a horizontal movement of a pointer indicating the movement of the tumbler gear in the direction of the shaft 65. As a result thereof, the previously and commonly used circular dials for positioning the tumbler gear idler 76 with respect to the cone gears could be replaced by a rectangular chart with even spaces for each number.

It should also be noted that according to the arrangement shown in Figure 2, the tumbler gear idler 76 is so arranged that whenever it engages one of the cone gears 52, the plane common to and through the centers of the tumbler and tumbler gear idler is always substantially vertical. The advantage of this arrangement consists in that the lifting component for disengaging the tumbler idler gear 76 from its respective cone gear 52 is a minimum, thereby easing the operation of the knob for effecting said disengagement.

*Adjustment of feed for lead screw or feed rod*

The threads to be chased by the lead screw or feeds obtainable by the feed rod according to available speed gears in the lathe are plotted on the chart (Figure 13) which is subdivided into a plurality of squares arranged in horizontal and vertical rows and each comprising two figures. The upper figure corresponds to the thread which may be chased by the lead screw and the lower figure in the same square corresponds to the feed per revolution of the spindle obtainable by the feed rod. The horizontal rows are marked AC—AD—AE—BC—BD—BE, and indicate the relative positions of the levers 36 and 37 toward each other. These levers, as previously mentioned under the heading "Shifting movement of cluster gears 63, 64" and "Shifting movement of clutch gear 86" determine the speeds corresponding to the position of the cluster gear 63, 64 and the clutch gear 86. The relative positions of the levers 36 and 37 determine the horizontal row of the chart 33, for instance, in Figure 11 the handle 36 points to B, while the handle 37 points to D. The horizontal row on the chart 33 corresponds to the relative position of the handles 36 and 37 for the horizontal row marked BD.

In order to shift the tumbler gear so that the gear system will cause the lead screw or feed rod to yield the desired thread or feed in the selected horizontal row, the knob 35 is rotated so that the pointer 34 will be in alignment with the desired thread or feed value in the selected horizontal row. In other words, while the position of the handles 36 and 37 determines the horizontal row on the chart 33, the pointer 34 determines the vertical row which contains the desired thread or speed value in the horizontal row. The actual shifting operation of the tumbler gear 76 which determines the movement of the pointer 34 has been described under the heading "Adjustment of tumbler gear idler 76."

HEAD STOCK

*Start-stop mechanism for spindle drive*

Referring to Figure 17, the pulley 179 which is driven by the motor in the rapid transverse drive compartment 22 is freely rotatably journalled in the anti-friction bearings 180 carried by a projection 180a at the end of the head stock 23. Connected with the pulley 179, for instance by screws 181, is a driving ring 182 which is toothed on its inside and engages a correspondingly toothed clutch disc 183. One side of the clutch disc 183 is adapted to be engaged by a clutch member 184 which is keyed to the hollow shaft 185, for instance by a hollow dog point set screw 186.

The clutch member 184 has a splined portion 187 which meshes with a correspondinly shaped splined portion of a second clutch member 188 adapted to engage the other side of the clutch disc 183. Threaded on or otherwise connected to the clutch member 184 is a ring 189 with ears 190 (only one ear shown) which are connected by links 191 and 192 with a yoke 193 which is threaded upon a shaft 194 and secured thereon by the lock nut 195. The shaft 194 is journalled in bushings 196 and 197 and extends throughout the entire length of the hollow shaft 185. Each link 191 has a surface 191a adapted to press against the annular surface 188a of the clutch member 188 so as to move the latter toward the clutch member 184, thereby pressing the clutch disc 183 between the clutch members 184 and 188. If this is effected, the rotation of the pulley 179 is conveyed through the clutch disc 183 and the clutch member 184 to the hollow shaft 185. The hollow shaft 185 drives a gear train which will be described later.

The end of the shaft 194 opposite the lock nut 195 is keyed, for instance by a pin 198, to a disc 199 and clutch sleeve 200. The clutch sleeve 200 has a circular recess 201 engaged by blocks 202 (Figure 14) which are swiveled in the clutch fork 203.

Operation of the clutch fork 203 causes the clutch sleeve 200 to move in one direction or the other. If the clutch sleeve 200 moves toward the left, with regard to Figure 17, the shaft 194 moves the yoke 193 toward the left which, by means of the links 191, spaces the link surface 191a from the surface 188a of the clutch member 188, which latter then slides on the splined portion 187 of the clutch member 184 toward the outside, thereby interrupting the driving connection between the pulley 179 and the hollow shaft 185. If, on the other hand, the clutch sleeve 200 is moved toward the right, with regard to Figure 17, the links 191 press against the clutch member 188 and cause the latter frictionally to engage the clutch disc 183, thereby establishing driving connection between the pulley 179 and the hollow shaft 185.

The clutch fork 203 is keyed by means of key 204 (Figure 14) to a shaft 205 which has keyed thereto a sleeve 206 with a forked arm 207 comprising a pin 208. Pivotally connected to the forked arm 207, by means of the pin 208, is a link 209 (Figure 13), the other end of which is pivotally connected by means of pin 210 with a similarly fork shaped arm 211. The sleeve portion 212 of the arm 211 (Figure 15) is keyed by key 213 to a shaft 214, which is journalled in the gear box casing and in bushings 215, spacing the shaft 214 from the sleeve 216 surrounding the shaft 214. The sleeve 216 is rotatably mounted in the gear box casing. Leakage along the shaft 214 and the sleeve 216 is prevented by packings 217 and 218 held in place by any convenient means.

The shaft 214 has keyed thereto, for instance by a pin 219, a segment 220 (Figure 2). The segment 220 meshes with a cylindrical rack 221 which is integral with the cylindrical rack 222 (Figure 4). The cylindrical racks 221 and 222 are slidably mounted in the gear box casing. The cylindrical rack 222 meshes with a gear segment 223 which is keyed, for instance by pin 224, to the shaft 225 (Figure 6), which is rotatably mounted in the gear box casing.

Keyed to the lower portion of the shaft 225, for instance by a pin 226, is a bevel gear 227 meshing with a similar bevel gear 228 keyed to the shaft 229. The shaft 229 has also keyed thereon the handle 49 (Figure 1). Shifting movement of the handle 49 in one or the other direction causes a partial rotation of the shaft 229 (Figure 6) which, by means of the bevel gears 228 and 227 and the shaft 225, causes the gear segment 223 connected thereto to swing in one or the other direction.

Swinging movement of the segment 223 causes a longitudinal movement of the rack 222 (Figure 4) so that the rack 221 (Figure 2) causes a swinging movement of the gear segment 220 meshing therewith. The swinging movement of the gear segment 220 causes a partial rotation of the shaft 214 and, thereby, also of the fork shaped arm 211 (Figures 13 and 15). The movement of the arm 211 is conveyed through the link 209 to the arm 207 (Figure 14) which is keyed to the shaft 205 and, thereby, causes a shifting movement of the clutch fork 203 keyed to the shaft 205.

The shifting movement of the clutch fork 203 causes the clutch sleeve 200 to move in one or the other direction, thereby causing the shaft 194 and the yoke 193 connected therewith to effect or interrupt the driving connection between the pulley 179 and the hollow shaft 185 which, as previously mentioned, drives the spindle of the lathe through a gear train.

*Spindle speed control*

The speed of the spindle shaft 230 is controlled by a gear system provided in the head stock 23. This gear system comprises a gear 231 which is keyed to the hollow shaft 185 adapted to be driven by the motor in the rapid transverse drive compartment 22 and the pulley 179 drivingly connected therewith.

The gear 231 meshes with the idler gear 232 having jaws 233 adapted to be engaged by corresponding jaws of the clutch sleeve 234. The clutch sleeve 234 is keyed to the shaft 235 but slidably mounted thereon so as either to engage the jaws 233 of the gear 232 or the jaws 236 of the idler gear 237 which meshes with a gear 238 also keyed to the hollow shaft 185.

The shaft 185 is journalled in anti-friction bearings 239, while the shaft 235 is journalled in anti-friction bearings 240. Keyed to the shaft 235 are gears 241 and 242 respectively meshing with gears 243 and 244. The gears 243 and 244 are idler gears on the shaft 245, which is journalled in anti-friction bearings 246 and has a splined portion on which is slidably mounted a clutch sleeve 247 adapted selectively to be engaged with the jaws 248 pertaining to the gear 243 or with the jaws 249 pertaining to the gear 244. The shaft 245 has a second splined portion on which is slidably mounted the correspondingly splined clutch sleeve 250, which is adapted selectively to be engaged with the clutch jaws 251 pertaining to the idler gear 252 or the clutch jaws 253 pertaining to the gear 254.

The gear 254 is keyed to a sleeve 255 having integral therewith a gear 256 meshing with an idler gear 257 comprising jaw clutches 258. The spindle shaft 230 has a splined portion slidably engaging a correspondingly splined clutch sleeve 259, which is adapted selectively to engage the jaw clutches 258 pertaining to the gear 257 or the jaw clutches 260 pertaining to the gear 261 which meshes with the gear 254. The gear 261 is integral with a sleeve 262 rotatable about the spindle shaft 230 and having keyed thereto a gear 263 meshing with the gear 252. The spindle shaft 230, which is journalled in anti-friction bearings 264 and 265, has keyed thereto two gears 266 and 266a, which are adapted selectively to drive a train of end or quadrant gears which are drivingly connected with the gears in the gear box as previously mentioned under "Arrangement of gear system."

The clutch sleeves 234, 247, 250 and 259 in the head stock are shifted into one or the other position by means of the levers 26, 27, 28 and 29 respectively. To this end the lever 26 (Figures 1 and 16) is keyed, for instance by pin 267, to a shaft 268 which is journalled in bushings 269 and 270 spaced from each other by a sleeve 271 surrounding the shaft 268 and spaced from the latter. The sleeve 271 is rotatably mounted in the head stock casing and is surrounded at its outer end by a packing 272 to prevent leakage along the outer surface of the sleeve 271, while leakage along the shaft 268 is prevented by a packing 273.

The shaft 268 has keyed thereto, for instance by a pin 274, a sleeve 275 pivotally connected with an arm 276 (Figure 13) which, in its turn, is pivotally connected by a pivot 277 with a lug 278 of the sleeve portion 279 (Figure 13) which is integral with the clutch fork 280 and rotatably mounted on the shaft 281. The clutch fork 280 has swiveled therein swivel members 282 which engage the annular recess 283 (Figure 17) of the clutch sleeve 247.

Consequently, when the lever 26 is shifted in one or the other direction, the shifting movement of the lever 26 causes a partial rotation of the shaft 268 and, therefore, also of the sleeve 274, which partial rotation is conveyed, by means of the arm 276, to the sleeve portion 279 of the clutch fork 280, so as to swing the latter in one or the other direction, thereby causing the clutch sleeve 247 to engage either the jaws 248 pertaining to the gear 243, or the jaws 249 pertaining to the gear 244, thereby positioning the respective gears according to the desired speed.

To lock the lever 26 in its respective position, it is provided with a detent plunger 284 continuously urged by means of a spring 285 into engagement with one of three detents or locking members 286 carried by the head stock casing; only one of said detent members 286 being shown in the drawings. The adjustment of the spring 285 is determined by the setting of the screw 287.

As will be seen from Figure 16, the lever 26 can be shifted only after it has been pulled away from the respective detent member 286 by shifting the handle 26 about the pivot 288 so that the detent plunger 284 slides over the end of the detent member 286. In order to prevent the detent plunger 284 from leaving its recess in the lever 26 when the latter is shifted about the pivot 288, a retaining screw 289 is provided in the handle 26 which engages a slot 290 in the detent plunger 284, thereby preventing the same from leaving its recess. After the lever 26 has been shifted into its desired position it is shifted back about the pivot 288 so that the plunger 284 engages another detent member 286 and is held thereby in its desired position.

The lever 27 (Figures 1 and 16) is, similar to the lever 26, shiftable about a pivot 291 and is keyed by a ring 292 to the sleeve 271 which has also keyed thereon a sleeve 293 with a lug 294 pivotally connected by a pivot 295 with a link 296 (Figure 13) which, in its turn, is pivotally connected by pivot 297 with a lug 298 of a sleeve 299 which is keyed by a pin 300 to the shaft 281. Also keyed to the shaft 281, by means of a pin 301, is a sleeve portion 302 integral with the clutch fork 303.

The clutch fork 303 has swiveled therein swivel members 304, which engage the annular recess 305 of the clutch sleeve 234 (Figure 17). Therefore, shifting movement of the lever 27 in one or the other direction causes a partial rotation of the sleeve 271 and, thereby, of the sleeve 293 keyed thereto which, by means of the arm 296 and the sleeve 299 keyed to the shaft 281, causes a shifting movement of the clutch fork 303, likewise keyed to the shaft 281. Depending on whether the clutch fork 303 is shifted in one or the other direction, the clutch sleeve 234 will engage either the clutch jaws 233 pertaining to the gear 232 or the jaws 236 pertaining to the gear 237, thereby placing the gear system in the head stock into the position corresponding to the desired spindle speed.

The handle 28 (Figure 1) is in a manner similar to that of the handles 26 and 27, operatively connected to the shaft 305 (Figure 14), which is journalled in bushings 307 and 308 mounted in a sleeve 309 which, in its turn, is rotatably mounted in the head stock casing.

Leakage of oil along the outside of the sleeve 309 is prevented by a packing 310, while leakage of oil along the shaft 306 is prevented by a packing 311. Keyed to the shaft 306, by means of a pin 312, is a sleeve 313 with a lug (not shown in the drawings but similar to the lug 314) see Figure 13. The lug of the sleeve 313 is pivotally connected with one end of a link 316, the other end of which is pivotally connected by pivot 317 with a lug 318 pertaining to the sleeve portion 319 integral with the clutch fork 320 and rotatably mounted on the shaft 321. Swiveled in the clutch fork 320 are swivel members 322 engaging an annular recess 323 in the clutch sleeve 259.

Shifting movement of the handle 28 in one or the other direction will, therefore, be conveyed through the shaft 306, the sleeve 313, link 316 to the clutch fork 320, the shifting movement of which will cause the clutch sleeve 259 to engage either the jaws 260 pertaining to the gear 261 or the jaws 258 pertaining to the gear 257, thereby positioning the gear system in the head stock according to the desired speed.

The lever 29 (Figure 1) is connected in a manner similar to that of levers 26 and 27, with the sleeve 309 which has keyed thereto the sleeve 324 having integral therewith a lug 314 pivotally connected to the link 325 by a pivot 315. The link 325 is pivotally connected by a pin 326 (Figure 13) with the lug 327 pertaining to the sleeve 328 which is keyed to the shaft 321a (Figure 14) by means of a pin 329.

Also keyed to the shaft 321a, by a pin 330, is the sleeve portion 331 pertaining to the clutch fork 332. Swiveled in the clutch fork 332 are swivel members 333 which engage an annular recess 334 in the clutch sleeve 250. Consequently, shifting movement of the lever 29 in one or the other direction causes a partial rotation of the sleeve 309, which conveys this rotation, by means of the link 325 and sleeve 328 to the shaft 321a which, in its turn, conveys its partial rotation to the clutch fork 332.

The shifting movement of the clutch fork 332 causes the clutch sleeve 250 to engage either the jaws 251 pertaining to the gear 252 or the jaws 253 pertaining to the gear 254, thereby selecting one of the said gears in correspondence to the desired spindle speed.

*Forward and reverse drive of gear system in gear box*

As previously mentioned under "Spindle speed control," the spindle shaft 230 is driven by the motor in the rapid transverse drive compartment 22 through the pulley 179 and the gear system in the head stock. The gear 266 keyed to the spindle shaft 230 meshes with an idler gear 364 (Figure 18), which is adapted freely to rotate about the shaft 365 having keyed thereto an end gear 366 which, as mentioned under "Arrangement of gear system," through a train of end or quadrant gears, drives the gears in the gear system.

The shaft 365 has a splined portion 367 engaging a correspondingly splined clutch sleeve 368, which is adapted selectively to be clutched to the gear 364 or to the idler gear 369, likewise freely rotatable about the shaft 365. The idler gear 369 meshes with an idler gear 370 freely rotatable about the reverse shaft 371 which is journalled in the head stock casing. The idler gear 370 meshes with the gear 266a keyed to the spindle shaft 230 (Figure 16).

When the clutch sleeve 368 is shifted into engagement with the idler gear 364, the forward drive for the gears in the gear box is established and effected from the spindle shaft 230 through the gear 266 keyed thereto, the gear 364, clutch sleeve 368 and the shaft 365 to the end gear 366 keyed thereto, and from there through an end or quadrant gear train to the input gear 58 in the gear box.

When the clutch sleeve 368 is shifted into engagement with the idler gear 369, the reverse drive for the gears in the gear box is established and effected from the spindle shaft 230, gear 266a keyed thereto, idler gear 370, idler gear 369, clutch sleeve 368, shaft 365, end gear 366 keyed to shaft 365, and from there through the end or quadrant gear train to the input gear 58 in the gear box 31.

It is obvious that depending on whether the input gear 58 is driven in one or the other direction, all shafts in the gear box and, therefore, also the lead screw and feed rod are driven in forward or reverse direction.

The shifting of the clutch sleeve 368 is effected by the lead screw reverse handle 53. The handle 53 is keyed to the lead screw reverse rod 55 (Figure 4) coming from the lathe apron 41 and entering the gear box. Near the end of the rod 55 is keyed thereto, for instance by a pin 372, a reverse screw 373 having a lead angle sufficiently great to provide reversible action in cooperation with the nut 374 engaging the reverse screw 373 and rigidly connected with the gear box casing so that the rod 55 may be moved either by axial thrust or by a partial rotation of the rod 55. The rod 55 is provided with a cylindrical rack 375 which meshes with a gear segment 376 (Figure 2) which is keyed to the sleeve 216 (Figure 15) spaced from the shaft 214 by the bushings 215 and rotatably mounted in the gear box casing.

Figure 18:
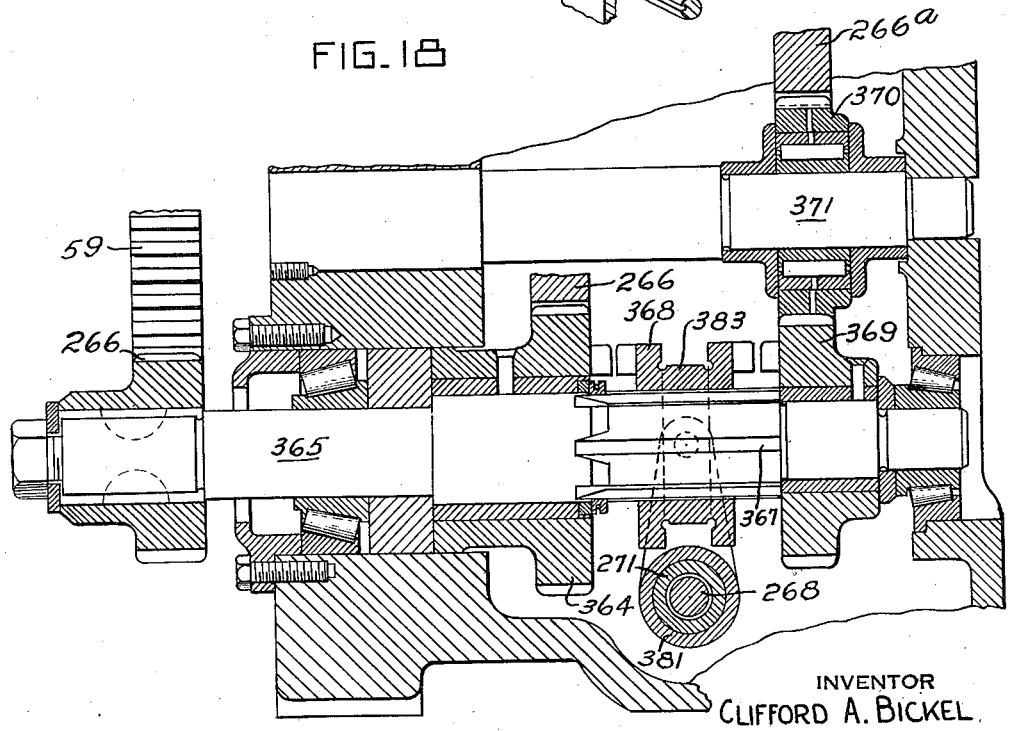
Figure 18 is a section along the line 18—18 of Figure 16.

Keyed to the sleeve 216 is a ring 377 with a toothed segment 378 (Figure 13) which meshes with a correspondingly toothed segment 379 integral with the sleeve portion 380 (see Figure 16) of the clutch fork 381. The sleeve portion 380 of the clutch fork 381 is freely rotatable about the sleeve 271 surrounding the shaft 268. The clutch fork 381 has swivelled therein swivel members 382 which engage the annular recess 383 of the clutch sleeve 368 (Figure 18).

Consequently, shifting movement of the handle 53 in one or the other direction from its intermediate or neutral position causes a partial rotation of the rod 55 and the reverse screw 373 keyed thereto which in its turn, due to its cooperation with the nut 374, imparts a longitudinal movement to the rod 55. This longitudinal movement is transmitted through the cylindrical rack 375 and the segment 376 into a partial rotation of the sleeve 216 which in its turn causes a shifting movement of the toothed segments 378 and 379, the latter of which is integral with the clutch fork 381 so that the clutch fork 381 is likewise partially rotated and shifts the clutch sleeve 368 into engagement with either idler gear 364 or idler gear 369, thereby establishing respectively forward drive or reverse drive of the gears in the gear box and the shafts driven thereby.

In order to prevent accidental shifting movement of the handle 53 and, consequently, of the clutch sleeve 368, the sleeve 216 (Figure 2) has keyed thereto a detent segment 384 with two recesses 385 (only one shown) in correspondence to the two possible positions of the handle 53. The recesses 385 are adapted to be engaged by a detent plunger 386 reciprocable in a bore 387 in the gear box casing and continuously urged toward the detent segment 384 by means of the spring 388.

Operation of lathe

Supposing the work piece is mounted between the centers 24 and 25 and the motor in the rapid transverse drive compartment 22 is running, while all operating parts of the lathe are idle because the start-stop handle 49 (Figure 1) is so shifted as to declutch the pulley 179 (Figure 17) from the gear in the head stock 23.

The operator now sets the machine for the desired spindle speed and the required feed for the tool. To this end he determines first the spindle speed. To do this he measures the diameter of the work piece to be machined and, knowing this diameter and the material of the work piece and the tool, he reads the surface speed from a chart.

The next step consists in the shifting movement of the levers 26 to 29 into the positions corresponding to the desired speed of the spindle. This shifting movement selects and sets the gears in the head stock into their proper positions corresponding to the desired spindle speed as fully explained under "Spindle speed control."

If the head stock gear system is thus fully prepared for operation, the operator next shifts the controls on the gear box to determine the lead or feed of the tool on the work, according to whether a thread is to be chased or a work piece to be machined. To this end he sets the handle 38 (Figure 1) to one of two positions, thereby manipulating the slip gear 97 (Figure 6) for driving either the lead screw 39 or the feed rod 40.

The operator now decides on the coarseness of the cut to be taken or of the thread to be chased and locates this cut or thread on the chart 33. He then manipulates the two handles 36 and 37 on top of the gear box for setting the cluster gear 63, 64 and the clutch gear 86, thereby selecting the horizontal row in which the desired thread or cut is located, as more fully explained under "Adjustment of feed for lead screw or feed rod."

Now the operator moves the pointer 34 over the vertical row in which the desired thread or cut lies by manipulating first the locking and unlocking handle 50 and then rotating the knob 35. The handle 50 serves to unlock the tumbler gear idler 76 for horizontal movement along the cone gears 52 and also disengages the tumbler gear idler from one of the cone gears with which it happens to be in mesh. Rotation of the knob 35 effects the horizontal movement of the tumbler gear idler 76 with regard to the cone gears 52.

The lathe is now ready for operation with the exception that the lead screw reverse handle must be set either for forward or reverse driving. To this end the handle 53 is shifted from its neutral or zero position into one of its two possible active positions, thereby clutching the clutch sleeve 368 (Figure 18) either to the idler gear 364 or the idler gear 369, depending on whether forward or reverse drive is desired.

To start or stop the lathe the start-stop handle 49 is shifted into one or the other position for making or breaking the driving connection between the pulley 179 and the spindle speed, as set forth under "Start-stop mechanism for spindle drive."

To engage the carriage 47, carrying the tool, with the lead screw 39, the operator manipulates the lever 54 which closes conventional half nuts on the lead screw. If it is desired to engage the cariage 47 with the feed rod, one of the clutch levers 45, 46 is actuated to pick up the drive from the feed rod and transmit it either to length feed or cross feed.

If it is desired to automatically stop the carriage 47 at a particular point during its movement, a stop collar 56 is placed on the lead screw reverse rod 55 in a position corresponding to the desired stop, and knurled adjusting nuts 57 are correspondingly located on the carriage for engaging the collar 56 at the desired point of travel so that the collar 56 keyed to the rod 55 will longitudinally shift the latter when engaged by the knurled nuts 57, thereby, due to the screw and nut 373, 374 (Figure 4) shift the handle 53 to neutral position in which the clutch sleeve 368 is disengaged from both the idler gear 364 and the idler gear 369, as fully explained under "Forward and reverse drive of gear system in gear box." The operator may now, if he wishes, shift the handle 53 for moving the carriage 47 in the opposite direction.

It will be understood that I desire to comprehend within my invention such modifications as come within the scope of the claims.

Having thus fully described my invention what I claim as new and desire to secure by Letters Patent is:

1. A lathe comprising in combination a plurality of speed gears, a selector gear adapted to be moved in axial direction and transverse thereto to selectively be engaged with or disengaged from any one of said speed gears, a casing enclosing said speed gears and said selector gear, means for driving said selector gear, supporting means for said selector gear having associated therewith a control member, a member bearing a cam surface adapted to engage said control member for selectively locating said selector gear or for actuating said control member to effect shifting movement of said gear supporting means about the axis of the elongated gear, a member movable relative to said cam bearing member for locking said control member thereagainst, and locking means independent of said cam bearing member and operable from the outside of the casing for preventing movement of said selector gear along the axis thereof until said locking means has been moved a predetermined distance away from its locking position.

2. A lathe comprising in combination a plurality of speed gears, an elongated gear, means for driving said elongated gear, a tumbler gear idler continuously meshing with said elongated gear and operable selectively to shift about or move along the same, a casing completely enclosing said speed gears and said tumbler gear idler, control means operatively connected with said tumbler gear idler to actuate the latter, a first slide adapted to engage said control means and to be moved for shifting said control means in one direction, a second slide adapted selectively to move said first slide in one direction for effecting said shifting movement of said control means, or to engage said control means for shifting the same in the opposite direction, said second slide being provided with two spaced racks, each rack meshing with one pinion, and a pinion shaft interconnecting said pinions and operable from the outside of said casing so as to effect rotation of said pinions.

3. A lathe comprising in combination a gear box completely closed toward the outside, a plurality of speed gears in said gear box, the axes of said speed gears being in alignment with each other, while said speed gears differ in diameter from each other, an elongated gear having its axis parallel to the axes of said speed gears, a tumbler gear idler continuously meshing with said elongated gear, supporting means supporting said tumbler gear idler and shiftable about said elongated gear and parallel thereto for moving said tumbler gear idler into position with or away from any one of said speed gears, a control member engaging said supporting means and operable to cause movement of said supporting means in the direction of the axis of said elongated gear, means engaging said control member for normally and positively preventing the latter from shifting said tumbler gear idler in a direction parallel to said elongated gear, and means operable from the outside of said gear box for positively disengaging said tumbler gear idler from the respective speed gear faced thereby and for concomitantly unlocking said control member to allow the latter to move said tumbler gear idler in a direction parallel to the axes of said speed gears.

4. A lathe comprising in combination a work spindle, a feed rod and a lead screw, means for driving said feed rod and said lead screw comprising a plurality of cone gears, an elongated gear, a gear train drivingly interconnecting said spindle with said elongated gear for driving the latter, a tumbler gear idler meshing with said elongated gear and adapted selectively to be shifted about said elongated gear for engagement with or disengagement from a selected cone gear or to be moved in the direction of the axis of said elongated gear, means for driving said elongated gear, a first control member operatively connected with said tumbler gear idler for effecting shifting movement thereof about said elongated gear, reciprocable cam means selectively operable for actuating said first control member, a second control member separate from said first control member and operatively connected with said tumbler gear idler for effecting movement thereof parallel to the axis of said elongated gear, locking cam means for positively locking and unlocking said control members in a predetermined sequence, a casing completely enclosing said gears, and means operable from the outside of said casing for actuating said control members.

5. A lathe comprising in combination a plurality of cone gears, an elongated gear, a tumbler gear idler meshing with said elongated gear and adapted selectively to be shifted about said elongated gear for engagement with or disengagement from a selected cone gear or to be moved in the direction of the axis of said elongated gear, means for driving said elongated gear, a first control member operatively connected with said tumbler gear idler for effecting shifting movement thereof about said elongated gear, a second control member operatively connected with said tumbler gear idler for effecting movement thereof parallel to the axis of said elongated gear, sliding means adapted selectively to actuate said first control member for effecting a shifting movement of said tumbler gear idler about said elongated gear or to lock said tumbler gear idler in its respective position, said sliding means being provided with a locking member normally engaging a locking member associated with said second control member, a casing completely enclosing said gears, means operable from the outside of said casing to actuate said sliding means, and means for preventing disengagement of said locking members until said sliding means has reached a predetermined position.

6. A lathe comprising in combination a plurality of cone gears having their axes in alignment with each other, an elongated gear parallel to the axes of said cone gears, a tumbler gear idler meshing with said elongated gear and shiftable about the axis of said elongated gear for engagement of said tumbler gear idler with or disengagement from a selected cone gear, a first control member operable for effecting a shifting movement of said tumbler gear idler about the axis of said elongated gear, a second control member operable to effect axial movement of said tumbler gear idler, a first slide having a locking member engaging a locking member on said second control member, a second slide adapted to actuate said first slide and selectively to cause movement of said first control member in one or the other direction to engage said tumbler gear idler with or disengage the same from its respective cone gear, a casing completely enclosing said gears, means operable from the outside of said casing for actuating said sliding means and for positively locking or unlocking said second control member responsive to a predetermined point of travel of said first control member.

7. A lathe comprising in combination an elongated gear, means for driving said gear, a tumbler gear idler in constant mesh with said elongated gear, change speed gearing adapted to be selectively engaged by said tumbler gear idler, supporting means for said tumbler gear idler shiftable about the axis of said elongated gear and parallel thereto to selectively move said tumbler gear idler in axial direction or transverse thereto for said change speed selection, controlling means associated with said supporting means, a plurality of cam members adapted selectively to engage said controlling means and to lock said controlling means therebetween, and a single member rotatable for both unlocking said controlling means and actuating the same to effect shifting movement of said supporting means about the axis of said elongated gear.

8. In a lathe gear box, an elongated gear adapted to be operatively connected with driving means, a tumbler gear idler in constant mesh with said elongated gear and slidable thereon, a plurality of speed gears adapted selectively to be engaged by said tumbler gear idler, a controlling member associated with said tumbler gear idler, a pair of slides adapted selectively to move said controlling member for shifting said tumbler gear idler about the axis of said elongated gear away from said speed gears or to lock said controlling member so as to retain said tumbler gear idler in engagement with a selected speed gear, and a single means for positively spacing said slides from each other to unlock said controlling means and for actuating the latter to cause shifting movement of said tumbler gear idler about the axis of said elongated gear.

9. A lathe comprising in combination an elongated gear, driving means for driving said elongated gear, a tumbler gear idler in constant mesh with said elongated gear and slidable thereon, change speed gearing adapted selectively to be engaged by said tumbler gear idler, supporting means for said tumbler gear idler movable selectively about the axis of said elongated gear and in the direction of said axis to move said tumbler gear idler in axial direction or transverse thereto for effecting a change speed selection, controlling means associated with said supporting means, a plurality of cam plates adapted to be moved relative to each other selectively for locking said controlling means to maintain said tumbler gear idler in engagement with a selected speed gear or to actuate said controlling means for effecting shifting movement of said tumbler gear idler away or toward a speed gear, and rack and pinion means associated with one of said cam plates and operable for positively moving said cam plates away from each other to unlock said controlling means and for actuating said controlling means to effect disengagement of said tumbler gear idler from its respective speed gear.

10. A lathe comprising in combination a plurality of speed gears, a selector gear operable to selectively engage any one of said speed gears, said selector gear being movable in two directions substantially forming a rectangle with each other, first manually operable means for moving said selector gear in one of said two directions, second manually operable means for moving said selector gear in the other direction, means for driving said selector gear, and a pointer movable in linear direction only, said pointer being connected with said selector gear and being movable by said second manually operable means in one of said two directions to thereby move in linear direction relative to and over fixed markings indicating the advance of a feed rod and/or lead screw associated with the lathe.

11. A lathe comprising in combination a plurality of speed gears, a selector gear operable selectively to engage any one of said speed gears, said selector gear also being movable in a direction substantially rectangular to said engaging and disengaging movement, means for driving said selector gear, and pointer means movably connected to said selector gear, said pointer means being movable only in one of the directions of movement of said selector gear and in correspondence to the movement thereof in said one direction.

12. A lathe comprising in combination a plurality of rotatable speed gears co-axially arranged and prevented from moving in the direction of their axis of rotation, a selector gear adapted selectively to be engaged with or disengaged from any one of said speed gears, supporting means for supporting said selector gear, said supporting means being movable relative to said speed gears and substantially parallel to the axis of rotation of said speed gears, pointer means drivingly connected with said supporting means and movable in linear direction only, in response to the movement of said supporting means substantially parallel to the axis of rotation of said speed gears, first manually operable means for bringing about said linear movement of said pointer, and second operable means operable independently of said first manually operable means for selectively causing said selector gear to engage or disengage the adjacent speed gear.

13. In a machine tool, an output rod, a rotating shaft, gearing adapted selectively to be connected with said rotating shaft for effecting a forward movement or a reverse movement of said output rod, a control shaft including a cylindrical gearing, a handle for rotating said control shaft, a screw keyed to said control shaft and meshing with a nut stationary in said machine tool, said screw having a lead angle sufficiently great to convert in cooperation with said nut a rotative movement of said screw into an axial movement of said control shaft or to impart an axial movement on said control shaft when the latter is rotated by actuation of said handle.

14. A lathe comprising in combination a plurality of speed gears, a selector gear adapted selectively to be engaged with or disengaged from any one of said speed gears, a shiftable speed changing gear adapted selectively to engage and operate either of two idler gears meshing with said speed gears or to disengage said idler gears and to mesh with one of said speed gears, a first control member shiftable selectively in one of three positions for setting said shiftable speed changing gear, a pair of driving gears adapted selectively to drive said speed gears, a speed changing member including two speed gears shiftable so as alternately to connect one of said last mentioned gears with one of said driving gears, a second control member shiftable selectively in one of two positions for shifting said speed changing member, a casing housing said gears, a flat feed and thread chart on the outside of said casing and comprising a plurality of horizontal and vertical rows with markings thereon indicating a plurality of feeds and/or threads obtainable with said lathe, pointing means operatively connected with said selector gear and movable in linear direction only with regard to said chart for selecting a vertical row containing the desired feed or thread, a handle on the outside of said casing for actuating both said pointing means and said selector gear, the horizontal row on said chart comprising the desired feed or thread being determined by the relative position of said control members.

15. A lathe comprising in combination a plurality of speed gears, an elongated gear, means for driving said elongated gear, a tumbler gear idler continuously meshing with said elongated gear and operable selectively to shift about or move along the same, a casing enclosing said speed gears and said tumbler gear idler, control means operatively connected with said tumbler gear idler for actuating the latter, a first cam means adapted to locate said control means so as to position said tumbler gear in mesh with one of said speed gears, means for shifting said cam means for actuating said control means to disengage said tumbler gear from said speed gear, means for shifting said control means axially of said elongated gear so as selectively to position said tumbler gear opposite one of said speed gears, a second cam means movable to engage said control means and to shift the same into engagement with said first cam means and thereafter to move said control means and said first cam means into said tumbler gear locating position, and means including a rack and pinion for actuating said second cam means.

16. A lathe comprising in combination a plurality of speed gears, an elongated gear, means for driving said elongated gear, a tumbler gear idler continuously meshing with said elongated gear and operable selectively to shift about or move along the same, a casing enclosing said speed gears and said tumbler gear idler, control means operatively connected with said tumbler gear idler for actuating the latter, a pair of members bearing opposed cam surfaces and movable relative to each other and to said control means for locking the same into position to maintain said tumbler gear idler in engagement with a selected speed gear or to actuate said control means for disengaging said tumbler gear idler from said speed gear, means selectively operable for shifting said control means axially of said elongated gear when said tumbler gear idler is disengaged from said speed gear, and means operable when said cam bearing members are positioned to lock said controlling means for preventing the actuation of said means for axially shifting said control means.

17. A lathe comprising in combination a spindle, a tool carrying member movable relative to said spindle, a lead screw and a feed rod selectively engageable with said member for driving the same, means for driving said spindle, a gear train interconnecting said spindle with said lead screw and said feed rod for selectively driving either said screw or said rod, and including clutch means selectively operable for driving said lead screw or said feed rod in a forward or in a reverse direction or for disconnecting the same from said gear train, and controlling means for controlling said last mentioned means comprising a shaft, a screw operatively connected with said shaft and engaging a stationary nut, said screw having a lead angle sufficiently great to be adapted in cooperation with said nut to convert a linear movement of said shaft into a rotation thereof, means associated with said tool carrying member and adapted to engage and move said shaft in response to a predetermined movement of said member, and means operatively connecting said shaft with said clutch means.

CLIFFORD A. BICKEL.